(12) United States Patent
Kang et al.

(10) Patent No.: US 11,523,300 B2
(45) Date of Patent: Dec. 6, 2022

(54) METHOD AND APPARATUS FOR CONFIGURING SIDELINK DATA BEARER IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/918,279

(22) Filed: Jul. 1, 2020

(65) Prior Publication Data
US 2021/0007002 A1   Jan. 7, 2021

(30) Foreign Application Priority Data
Jul. 2, 2019 (KR) .................. 10-2019-0079706

(51) Int. Cl.
| | |
|---|---|
| *H04W 28/02* | (2009.01) |
| *H04W 72/10* | (2009.01) |
| *H04W 76/27* | (2018.01) |
| *H04W 4/40* | (2018.01) |
| *H04W 72/14* | (2009.01) |
| *H04W 88/06* | (2009.01) |
| *H04W 72/12* | (2009.01) |
| *H04L 5/00* | (2006.01) |

(52) U.S. Cl.
CPC ......... *H04W 28/0252* (2013.01); *H04W 4/40* (2018.02); *H04W 72/10* (2013.01); *H04W 76/27* (2018.02); *H04L 5/001* (2013.01); *H04W 72/1289* (2013.01); *H04W 72/14* (2013.01); *H04W 88/06* (2013.01)

(58) Field of Classification Search
CPC . H04W 28/0252; H04W 72/10; H04W 76/27; H04W 4/40; H04W 72/14
See application file for complete search history.

(56) References Cited

U.S. PATENT DOCUMENTS

| | | | |
|---|---|---|---|
| 2016/0323777 A1* | 11/2016 | Pan | H04B 7/14 |
| 2017/0041818 A1* | 2/2017 | Lee | H04W 4/70 |
| 2018/0234995 A1* | 8/2018 | Jung | H04W 72/1247 |
| 2018/0255499 A1* | 9/2018 | Loehr | H04W 40/22 |

(Continued)

FOREIGN PATENT DOCUMENTS

| | | |
|---|---|---|
| EP | 3 723 435 A1 | 10/2020 |
| KR | 10-2016-0110387 A | 9/2016 |

OTHER PUBLICATIONS

International Search Report dated Oct. 8, 2020, issued in International Application No. PCT/KR2020/008617.

(Continued)

*Primary Examiner* — Mohammad S Anwar
(74) *Attorney, Agent, or Firm* — Jefferson IP Law, LLP

(57) ABSTRACT

A communication method of a first sidelink terminal in a wireless communication system is provided. The communication method includes obtaining sidelink radio bearer configuration information, identifying default sidelink radio bearer information in the sidelink radio bearer configuration information, and transmitting data to a base station or a second sidelink terminal based on the default sidelink radio bearer information.

16 Claims, 23 Drawing Sheets

(56) References Cited

U.S. PATENT DOCUMENTS

2020/0146046 A1 5/2020 Agiwal et al.

OTHER PUBLICATIONS

Zte et al., 'Discussion on QoS management for NR V2X', R2-1900383, 3GPP, TSG RAN WG2 #105, Athens, Greece, Feb. 15, 2019, pp. 1-4.
Asustek, 'Discussion on UL/SL TX prioritization', R2-1901036, 3GPP TSG, RAN WG2 #105, Athens, Greece, Feb. 14, 2019, pp. 1-3.
Intel Corporation, 'UL/SL prioritization for NR V2X', R2-1906433, 3GPP, TSG RAN WG2 #106, Reno, USA, May 3, 2019, pp. 1-2.
Ericsson, 'Simultaneous operation of Mode 1 and Mode 2', R1-1907139,, 3GPP TSG RAN WG1 #97, Reno, USA, May 3, 2019, pp. 1-2.
Qualcomm Inc., "QoS for NR V2X", 3GPP TSG-RAN WG2 Meeting #105bis, XP051731015, R2-1907579, Reno USA, May 13-17, 2019.
Huawei, "Discussion on the default DRB for NR SL", 3GPP TSG-RAN WG2 Meeting #106, XP051730891, R2-1907455, Reno, USA, May 13-17, 2019.
LG Electronics, "5G V2X with NR sidelink", 3GPP TSG RAN meeting #84, XP051739262, RP-190983, Newport Beach, USA, Jun. 3-6, 2019.
Asustek, "Discussion on UL/SL TX Prioritization", XP0517300023GPP, R2-1906541, TSG-RAN2 Meeting #106 Reno, USA, May 13-17, 2019.
European Search Report dated Jul. 13, 2022, issued in European Application No. 20834492.9.

* cited by examiner

FIG. 2
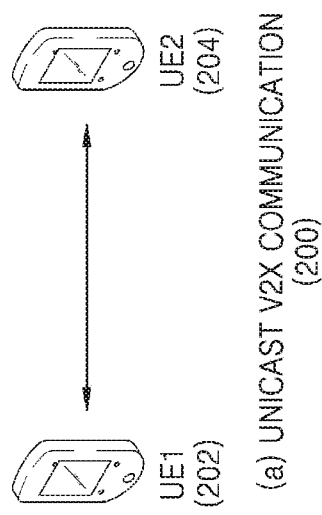
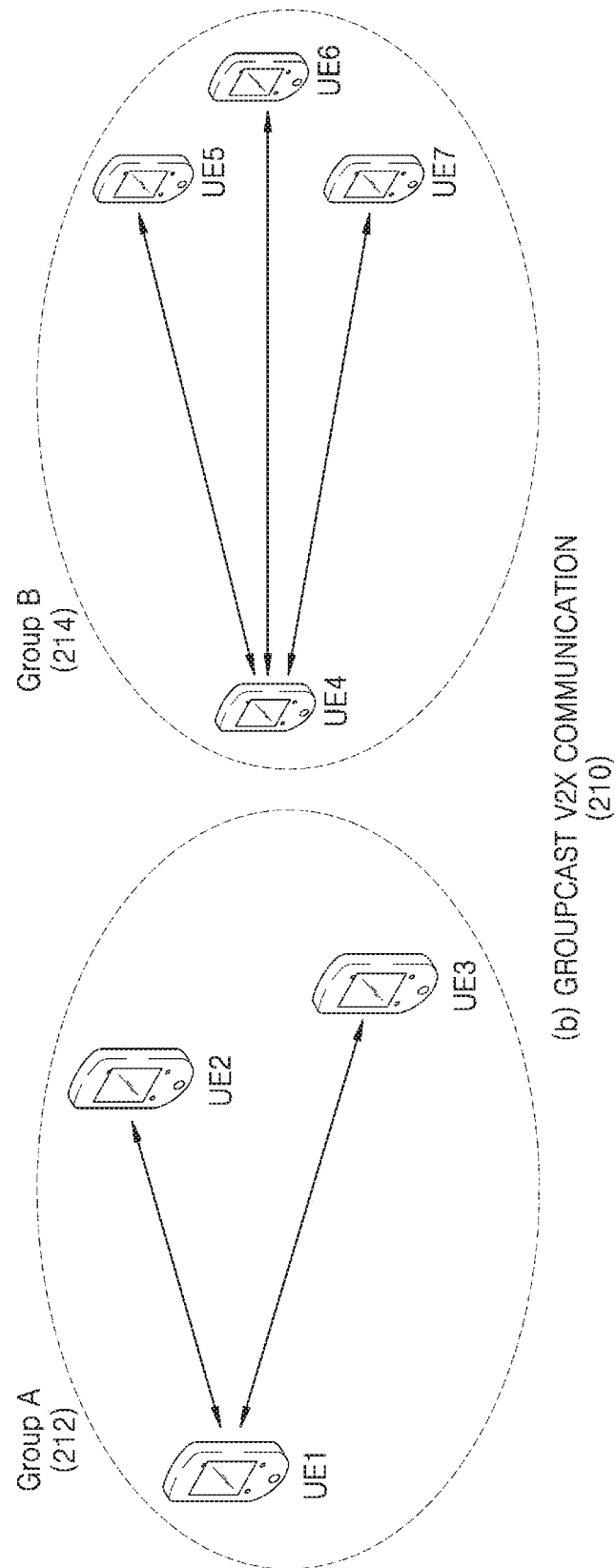

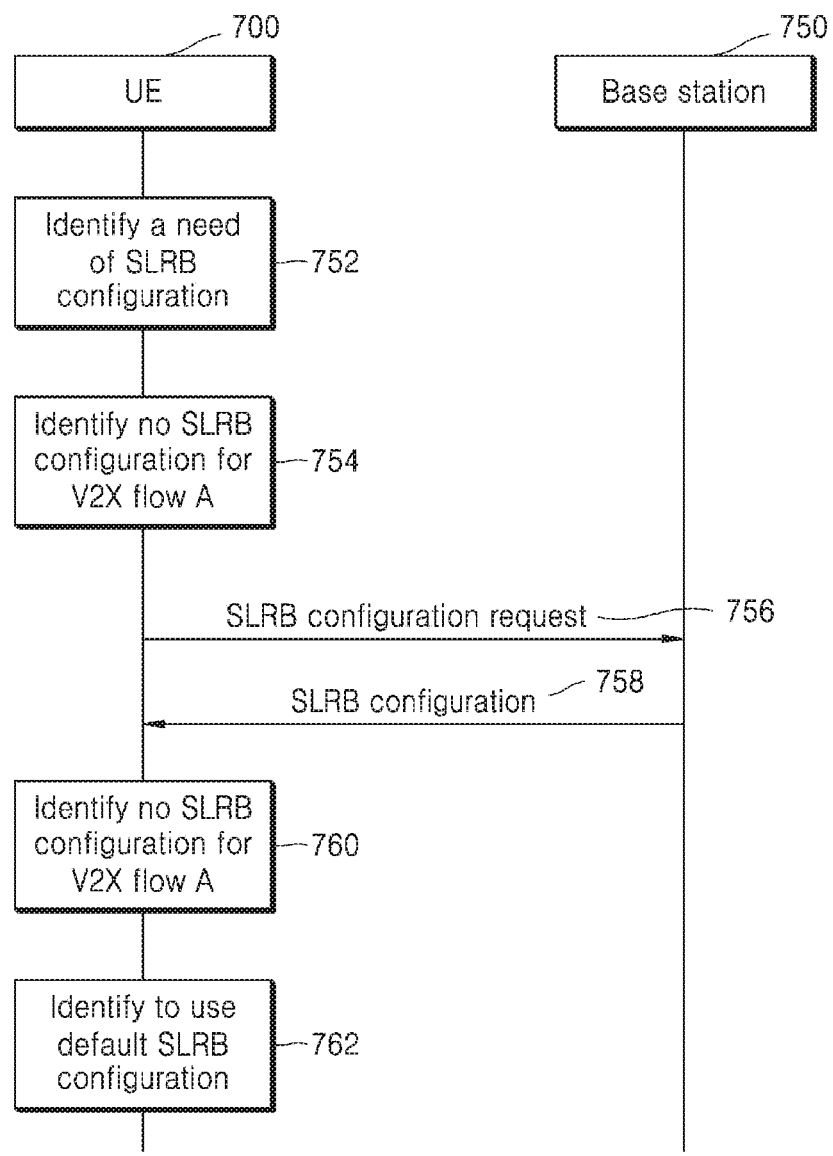

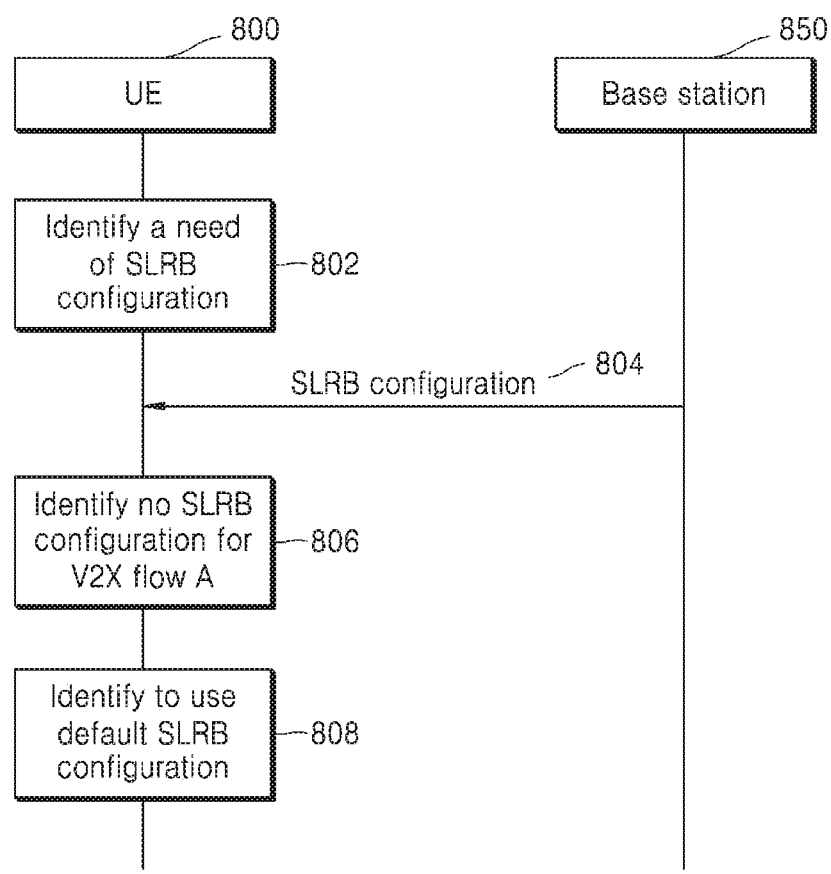

METHOD AND APPARATUS FOR CONFIGURING SIDELINK DATA BEARER IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0079706, filed on Jul. 2, 2019, in the Korean Intellectual Property Office, the disclosure of which is incorporated by reference herein in its entirety.

BACKGROUND

1. Field

The disclosure relates to a wireless communication system. More particularly, the disclosure relates to a method and apparatus for transmitting and receiving a signal between terminals by using a sidelink.

2. Description of Related Art

In order to meet the increasing demand with respect to wireless data traffic after the commercialization of 4th generation (4G) communication systems, efforts have been made to develop improved 5th generation (5G) communication systems or pre-5G communication systems. For this reason, 5G communication systems or pre-5G communication systems are called 'beyond 4G network communication systems' or 'post long term evolution (LTE) systems'. In order to achieve a high data rate, consideration is given to implementing 5G communication systems in millimeter wave (mmW) frequency bands (e.g., 60 GHz bands). In order to reduce propagation path loss of radio waves and increase a propagation distance of radio waves in millimeter wave frequency bands, in 5G communication systems, discussions are underway about technologies such as beamforming, massive multiple-input multiple-output (MIMO), full dimensional MIMO (FD-MIMO), array antenna, analog beamforming, and large scale antenna. Also, in order to improve networks of systems, in 5G communication systems, development of technologies such as evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation is underway. Furthermore, in 5G communication systems, development of an advanced coding modulation (ACM) scheme such as hybrid frequency-shift keying (FSK) and quadrature amplitude modulation (QAM) modulation (FQAM) or sliding window superposition coding (SWSC) and an enhanced network access scheme such as filter bank multi carrier (FBMC), non-orthogonal multiple access (NOMA), or sparse code multiple access (SCMA), is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology.

As various services may be provided with the development of mobile communication systems as described above, there is a demand for, in particular, a method of effectively providing vehicle-to-everything (V2X) communication by using a 5G communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for operating a sidelink bearer in a vehicle-to-everything (V2X) system.

Additional aspects will be set forth in part in the description which follows and, in part, will be apparent from the description, or may be learned by practice of the presented embodiments.

In accordance with an embodiment of the disclosure, a communication method of a first sidelink terminal in a wireless communication system is provided. The communication method includes obtaining sidelink radio bearer configuration information, identifying default sidelink radio bearer information in the sidelink radio bearer configuration information, and transmitting data to a base station or a second sidelink terminal based on the default sidelink radio bearer information.

The sidelink radio bearer configuration information may be included in a response message to a configuration request message of the first sidelink terminal, is included in system information received from the base station, or is included in preconfigured configuration information.

The obtaining of the sidelink radio bearer configuration information may include, if the first sidelink terminal is in an RRC_CONNECTED MODE, requesting, by the first sidelink terminal, to the base station, the sidelink radio bearer configuration information and obtaining the sidelink radio bearer configuration information through a response message in response to the requesting.

The obtaining of the sidelink radio bearer configuration information may include, if the first sidelink terminal is in an RRC_IDLE MODE or an RRC_INACTIVE MODE, obtaining the sidelink radio bearer configuration information through system information received from the base station.

The obtaining of the sidelink radio bearer configuration information may include, if the first sidelink terminal is in an Out-Of-Coverage state, obtaining the sidelink radio bearer configuration information from preconfigured information.

The communication method may further include obtaining new sidelink radio bearer configuration information during a state transition or coverage change of the first sidelink terminal, and applying the obtained new sidelink radio bearer configuration information.

The sidelink radio bearer configuration information may further include priority information of transmission of sidelink data and uplink data, wherein the priority information includes a priority threshold value.

The transmitting of the data to the base station may be further based on the priority information, and the transmitting of the data to the base station based on the identified default sidelink radio bearer and the priority information may include if the uplink data and the sidelink data are unable to be simultaneously transmitted, determining whether to transmit the sidelink data prior to the uplink data based on the priority threshold value, and transmitting one of the uplink data and the sidelink data based on the determining.

The determining whether to transmit the sidelink data prior to the uplink data based on the priority threshold value may include, when the uplink data transmission is configured to be prioritized over the sidelink data transmission, determining to transmit the uplink data prior to the sidelink data.

The priority information may be configured for each sidelink flow, and the uplink data includes uplink data transmitted to the base station connected by using dual connectivity to the first sidelink terminal.

In accordance with another aspect of the disclosure, a first sidelink terminal of a wireless communication system is provided. The first sidelink terminal includes a transceiver, and a processor coupled to the transceiver and configured to obtain sidelink radio bearer configuration information, identify default sidelink radio bearer information in the sidelink radio bearer configuration information, and transmit data to a base station or a second sidelink terminal based on the default sidelink radio bearer information.

The sidelink radio bearer configuration information may be included in a response message to a configuration request message of the first sidelink terminal, is included in system information received from the base station, or is included in preconfigured configuration information.

The processor may be further configured to, when the first sidelink terminal is in an RRC_CONNECTED MODE, request, by the first sidelink terminal, to the base station, the sidelink radio bearer configuration information and obtain the sidelink radio bearer configuration information through a response message in response to the request.

The processor may be further configured to, when the first sidelink terminal is in an RRC_IDLE MODE or an RRC_INACTIVE MODE, obtain the sidelink radio bearer configuration information through system information received from the base station.

The processor may be further configured to, when the first sidelink terminal is in an Out-Of-Coverage state, obtain the sidelink radio bearer configuration information from preconfigured information.

The processor may be further configured to obtain new sidelink radio bearer configuration information during a state transition or coverage change of the first sidelink terminal, and apply the obtained new sidelink radio bearer configuration information.

The radio bearer configuration information may further include priority information of transmission of sidelink data and uplink data, wherein the priority information includes a priority threshold value.

The transmission of the data to the base station is further based on the priority information, and the processor may be further configured to, when the uplink data and the sidelink data are unable to be simultaneously transmitted, determine whether to transmit the sidelink data prior to the uplink data based on the priority threshold value, and transmit one of the uplink data and the sidelink data based on a determination.

The processor may be further configured to, when the uplink data is data configured to be preferentially transmitted, determine to transmit the uplink data based on a priority.

The priority information may be configured for each sidelink flow, and the uplink data includes uplink data transmitted to the base station connected by using dual connectivity to the first sidelink terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a diagram illustrating vehicle-to-everything (V2X) communication performed through a sidelink, according to an embodiment of the disclosure;

FIG. 7B is a diagram illustrating a signal flow when a terminal determines an SLRB configuration, according to an embodiment of the disclosure;

FIG. 8 is a diagram illustrating a signal flow when a terminal determines an SLRB configuration, according to an embodiment of the disclosure;

Throughout the drawings, like reference numerals will be understood to refer to like parts, components, and structures.

DETAILED DESCRIPTION

Figure 1A:
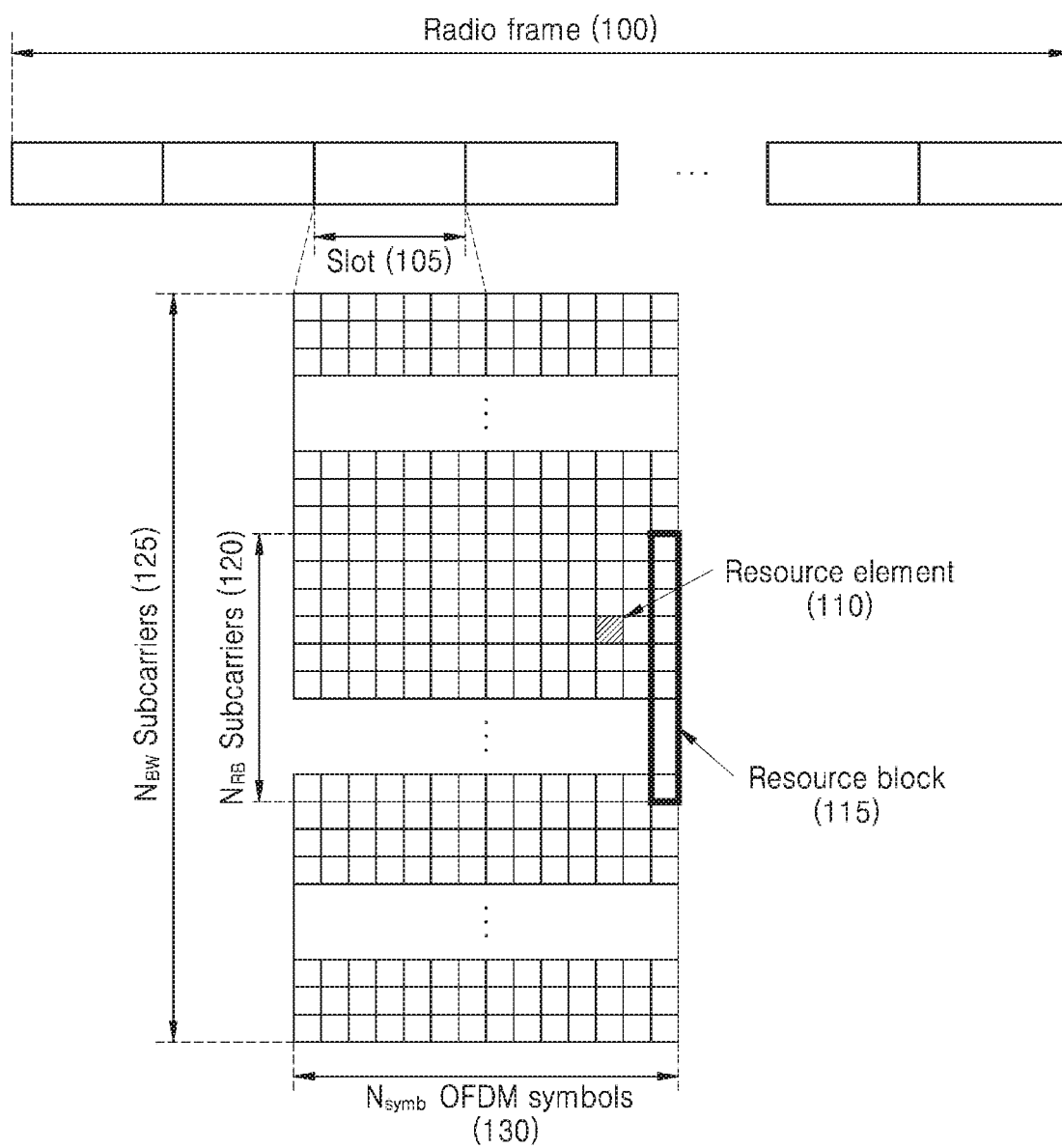
FIG. 1A is a diagram illustrating a structure of a wireless time-frequency resource of a New Radio (NR) system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing embodiments of the disclosure, descriptions of techniques that are well known in the art and not directly related to the disclosure are omitted. This is to clearly convey the points of the disclosure by omitting an unnecessary explanation. The terms used herein are those defined in consideration of functions in the disclosure, but the terms may vary according to the intention of users or operators, precedents, etc. Therefore, the terms used herein have to be defined based on the meaning of the terms together with the description throughout the specification.

For the same reason, some elements in the attached drawings are exaggerated, omitted, or schematically illustrated. Also, a size of each element does not entirely reflect a real size of the element. In the drawings, the same or corresponding elements are denoted by the same reference numerals.

The advantages and features of the disclosure and methods of achieving them will become apparent with reference to embodiments of the disclosure described in detail below along with the attached drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure to one of ordinary skill in the art, and the scope of the disclosure is defined only by the accompanying claims. In the specification, the same reference numerals denote the same elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). Because these computer program instructions may also be stored in a computer usable or computer-readable memory that may direct a computer or other programmable data processing apparatus to function in a particular manner, the instructions stored in the computer usable or computer-readable memory may produce an article of manufacture including instruction means that implement the functions specified in the flowchart block(s). Because the computer program instructions may also be loaded onto a computer or other programmable data processing apparatus, a series of operational may be performed on the computer or other programmable apparatus to produce a computer implemented process, and thus the instructions executed on the computer or other programmable apparatus may provide operation for implementing the functions specified in the flowchart block(s).

In addition, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

The term "~unit" used in the embodiment of the disclosure refers to a software or hardware component, such as a field-programmable gate array (FPGA) or an application-specific integrated circuit (ASIC), which performs certain tasks. However, "~unit" does not mean to be limited to software or hardware. The term "~unit" may be configured to be in an addressable storage medium or configured to operate one or more processors. Thus, "~unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~units" may be combined into fewer components and "~units" or further separated into additional components and "~units". Further, components and "~units" may be implemented to operate one or more central processing units (CPUs) in a device or a secure multimedia card. Also, a unit may include one or more processors in an embodiment of the disclosure.

While detailed descriptions of embodiments of the disclosure will be made mainly based on a new RAN (NR) that is a radio access network according to a $5^{th}$ generation (5G) network standard defined by the $3^{rd}$ generation partnership project (3GPP) that is a mobile communication standards organization, and a packet core (e.g., a 5G system, a 5G core network, or a next generation (NG) core) that is a core network, the gist of the disclosure may also be applied to other communication systems having a similar technical background, with some modifications without departing from the scope of the disclosure, and this may be determined by one of ordinary skill in the art.

Hereinafter, some terms and names defined in the $3^{rd}$ generation partnership project long term evolution (3GPP LTE) standard (e.g., 5G, New Radio (NR), LTE, or standards of similar systems) may be used for convenience of description. However, the disclosure may not be limited to the terms and names, and may also be applied to systems following other standards.

Hereinafter, terms indicating a connection node, terms indicating network entities, terms indicating messages, terms indicating an interface between network entities, and terms indicating various pieces of identification information, as used in the following description, are exemplified for convenience of explanation. Accordingly, the disclosure is not limited to the terms to be described later, but other terms indicating objects having equal technical meanings may be used.

Hereinafter, a base station is an entity performing resource allocation for a terminal and may include at least one of a gNode B, an eNode B, a Node B, a base station (BS), a radio access unit, a base station controller, or node on a network. A terminal may include a user equipment (UE), a mobile station (MS), a cellular phone, a smartphone, a computer, or a multimedia system capable of performing a communication function. However, the disclosure is not limited to the above examples.

In particular, the disclosure may be applied to 3GPP NR (5G mobile communication standard). Also, the disclosure may be applied to intelligent services based on 5G communication technology and Internet of Things (IoT)-related technology (e.g., smart home, smart building, smart city, smart car or connected car, health care, digital education, retail business, security, and safety-related services). In the disclosure, an evolved node B (eNB) may be interchangeably used with a next generation node B (gNB) for convenience of explanation. That is, a base station described as an eNB may refer to a gNB. Also, the term "terminal" may refer to other wireless communication devices as well as mobile phones, NB-IoT devices, and sensors.

In order to meet the increasing demand with respect to wireless data traffic after the commercialization of 4th generation (4G) communication systems, efforts have been made to develop improved 5G New Radio (NR) communication systems. In order to achieve a high data transmission rate, 5G communication systems are designed to support millimeter-wave (mmWave) frequency bands (e.g., 28 GHz). In order to reduce propagation path loss and increase a transmission distance in millimeter wave frequency bands, in 5G communication systems, discussions are underway about technologies such as beamforming, massive multiple-input multiple-output (MIMO), full dimensional MIMO (FD-MIMO), array antenna, analog beamforming, and large-scale antennas. In addition, unlike LTE systems, 5G communication systems support various subcarrier spacings (SCSs) such as 15 kHz, 30 kHz, 60 kHz, and 120 kHz, and a physical control channel is encoded by using polar coding, and a physical data channel is encoded by using low density parity check (LDPC). In addition, as waveforms for uplink transmission, not only cyclic prefix-orthogonal frequency division multiplexing (CP-OFDM) but also discrete Fourier transform-spread-orthogonal frequency division multiplexing (DFT-S-OFDM) are used. Also, NR systems may additionally support hybrid automatic repeat request (HARQ) retransmission based on a code block group (CBG) in which multiple code blocks (CBs) are grouped.

In order to improve networks of systems, in 5G communication systems, development of technologies such as evolved small cells, advanced small cell, cloud radio access network (cloud RAN), ultra-dense network, device-to-device (D2D) communication, wireless backhaul, vehicle-to-everything (V2X) network, cooperative communication, coordinated multi-points (CoMP), and interference cancellation is underway.

The Internet is evolving from a human-centered connection network through which humans create and consume information to an Internet of Things (IoT) network through which distributed elements such as objects exchange and process information. Internet of Everything (IoE) technology, which is a combination of IoT technology and big data processing technology through connection with a cloud server, is also emerging. In order to implement the IoT, technology elements such as sensing technology, wired/wireless communication and network infrastructure, service interface technology, and security technology are required, and thus technology for inter-object connection, such as a sensor network, machine to machine (M2M) communication, or machine-type communication (MTC), has recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Various attempts have been made to apply 5G communication systems to IoT networks. For example, technology such as sensor network, M2M communication, or MTC is implemented by 5G communication technology such as beamforming, MIMO, or array antenna. The application of a cloud RAN as big data processing technology may also be considered as an example of convergence of 5G technology and IoT technology. As such, a plurality of services may be provided to a user in a communication system, and in order to provide a plurality of services to a user, there is a demand for a method of providing each service within the same time interval according to characteristics, and an apparatus using the method. Various services provided by 5G communication systems are being studied, and one of the various services is a service that satisfies the requirements of low latency and high reliability.

In vehicular communication, standardization for V2X technology based on a device-to-device (D2D) communication structure in an LTE system has been completed in 3GPP Release 14 and Release 15, and efforts are being made to develop V2X technology based on 5G NR. NR V2X is to support unicast communication, groupcast (or multicast) communication, and broadcast communication between terminals. Also, unlike LTE V2X that aims to transmit and receive basic safety information required for road driving of vehicles, NR V2X aims to provide more improved services such as platooning, advanced driving, extended sensor, and remote driving.

A sidelink (SL) refers to a link for transmitting/receiving a signal between terminals, and may be interchangeably used with a PC5 interface. Hereinafter, a base station that performs resource allocation for a terminal may be a base station supporting both V2X communication and general cellular communication, or a base station supporting only V2X communication. That is, examples of a base station may include an NR base station (gNB), an LTE base station (eNB), and a road side unit (RSU). Examples of a terminal may include a general user equipment, a mobile station, a vehicle supporting vehicle-to-vehicle (V2V) communication, a vehicle supporting vehicle-to-pedestrian (V2P) communication, a handset (e.g., a smartphone) of a pedestrian, a vehicle supporting vehicle-to-network (V2N) communication, a vehicle supporting vehicle-to-infrastructure (V2I) communication, an RSU having a terminal function, an RSU having a base station function, and an RSU having a part of a base station function and a part of a terminal function.

A base station and a terminal are connected to each other through a Uu interface. An uplink (UL) refers to a radio link for transmitting a data or a control signal from a terminal to a base station, and a downlink (DL) refers to a radio link for transmitting data or a control signal from a base station to a terminal. Also, hereinafter, higher layer signaling may refer to radio resource control (RRC) signaling, and may include a system information block and a master information block.

The disclosure provides a V2X system, and more particularly, a method and apparatus for operating a sidelink bearer for performing data transmission in a process in which a vehicle terminal supporting V2X transmits/receives data by using a sidelink to/from another vehicle terminal or a pedestrian mobile terminal.

The disclosure provides a method of configuring a sidelink radio bearer (SLRB) corresponding to a V2X flow of a wireless communication system, the method including transmitting, by a terminal, requested quality of service (QoS) information of a V2X flow to a base station, transmitting, by the base station, sidelink radio bearer configuration information based on the QoS information of the V2X flow, determining, by the terminal, a sidelink radio bearer configuration for the V2X flow, determining, by the terminal, a default sidelink radio bearer configuration for the V2X flow, exchanging, by the terminal, the sidelink radio bearer configuration information for the V2X flow with a counterpart terminal, obtaining, by the terminal, priority information in the sidelink radio bearer configuration information for the V2X flow, configuring, by the base station, priority information in the sidelink radio bearer configuration for the V2X flow, and determining, by the terminal, a priority between sidelink transmission and uplink transmission based on the priority information of the V2X flow.

Embodiments of the disclosure will now be described in detail with reference to the accompanying drawings.

FIG. 1A is a diagram illustrating a structure of a wireless time-frequency resource of an NR system according to an embodiment of the disclosure.

Referring to FIG. 1A, in a wireless resource region, the horizontal axis represents a time domain and the vertical axis represents a frequency domain. In the time domain, a minimum transmission unit is an OFDM symbol or a DFT-S-OFDM symbol, and Nsymb OFDM or DFT-S-OFDM symbols 130 may constitute one slot 105. Unlike a slot, in an NR system, a length of a subframe may be 1.0 ms and a length of a radio frame 100 may be 10 ms. In the frequency domain, a minimum transmission unit is a sub-carrier, and a bandwidth of an overall system transmission band may include NBW subcarriers 125 in total. However, the above specific values may be variably applied according to systems.

A basic unit in a time-frequency resource domain is a resource element (RE) 110 and may be defined by an OFDM symbol index (or a DFT-S-OFDM symbol index) and a subcarrier index A resource block (RB) 115 is defined by NRB continuous subcarriers 120 in the frequency domain. In general, a minimum transmission unit of data may be an RB, and in the NR system, Nsymb=14 and NRB=12 in general. Although the structure of the wireless time-frequency resource is applied to a Uu interface, a similar structure may also be applied to sidelink communication. However, the disclosure is not limited to the above examples.

Figure 1B:
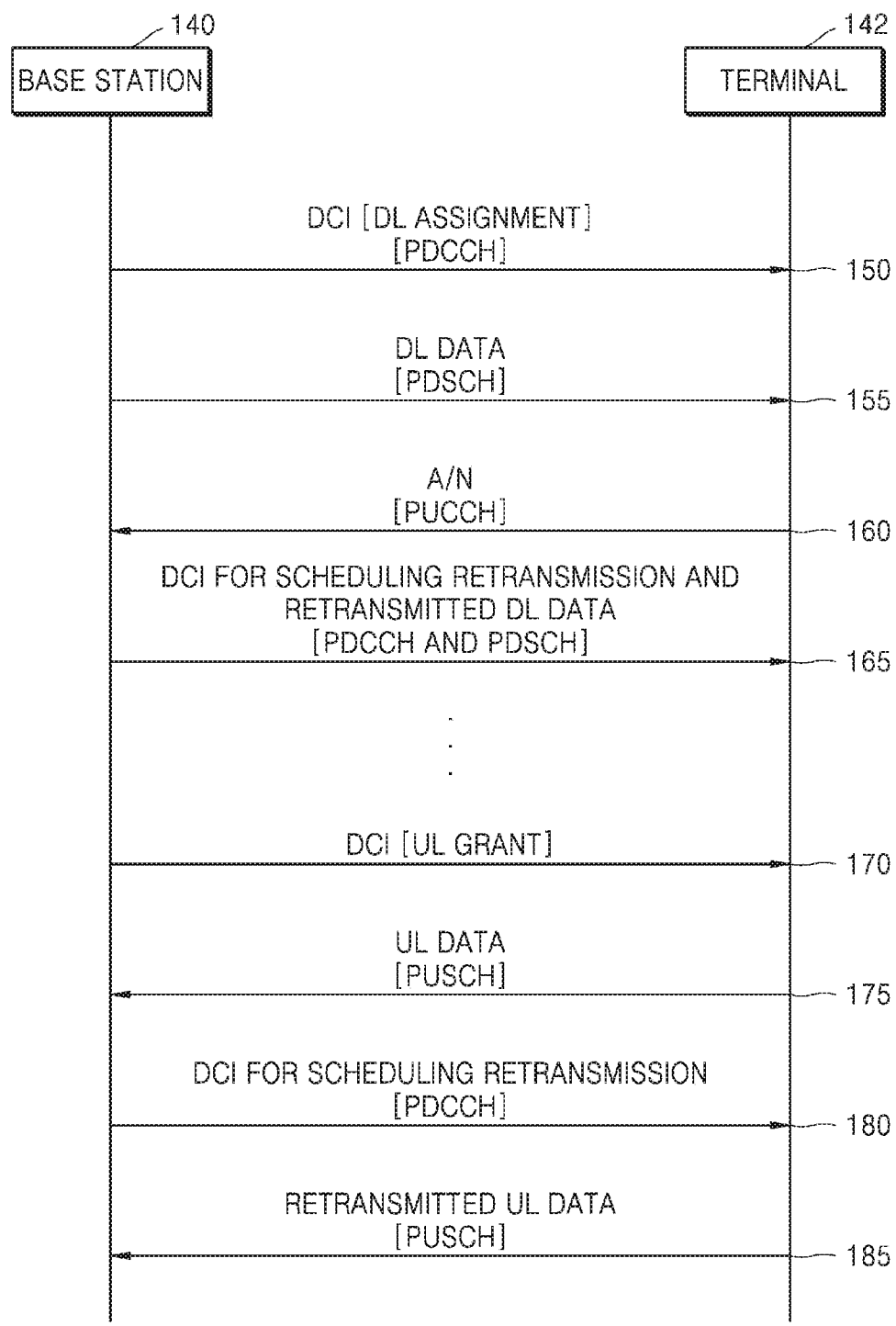
FIG. 1B is a diagram illustrating data transmission in an NR system, according to an embodiment of the disclosure.

FIG. 1B is a diagram illustrating data transmission in an NR system according to an embodiment of the disclosure.

Referring to FIG. 1B, a base station 140 may transmit, through a physical downlink control channel (PDCCH), downlink control information (DCI) for scheduling DL data transmission (which may be interchangeably used with DL assignment or DL grant) to a terminal 142 (operation 150). The DCI may be DCI format 1_0 or 1_1, and the DCI format 1_1 may include information as shown in Table 1. However, the disclosure is not limited to the following examples.

TABLE 1

Carrier indicator - 0 or 3 bits
Identifier for DCI formats - [1] bits
Bandwidth part indicator - 0, 1 or 2 bits
Frequency domain resource assignment
    For resource allocations type 0, $\lceil N_{RB}^{UL,BWP} / P \rceil$ bits
    For resource allocations type 1, $\lceil \log_2(N_{RB}^{UL,BWP} (N_{RB}^{UL,BWP}+1)/2) \rceil$ bits
Time domain resource assignment -1, 2, 3, or 4 bits
VRB-to-PRB mapping (virtual resource block -to- physical resource block mapping )

TABLE 1-continued

- 0 or 1 bit, only for resource allocation type 1,
    0 bit if only resource allocation type 0 is configured;
    1 bit otherwise.
PRB bundling size indicator - 0 or 1 bit
Rate matching indicator - 0, 1, or 2 bits
ZP CSI-RS trigger - 0, 1, or 2 bits
For transport block 1 :
    Modulation and coding scheme - 5 bits
    New data indicator - 1 bit
    Redundancy version - 2 bits
For transport block 2 :
    Modulation and coding scheme - 5 bits
    New data indicator - 1 bit
    Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0, or 3 bits
SRS request - 2 bits
CBG transmission information - 0, 2, 4, 6, or 8 bits
CBG flushing out information - 0 or 1 bit
DMRS sequence initialization - 1 bit The DCI may be transmitted through a physical downlink control channel (PDCCH) through channel coding and modulation, and a cyclic redundancy check (CRC) may be attached to the DCI and may be scrambled by a radio network temporary identifier (RNTI) corresponding to terminal identity. Upon receiving the DCI transmitted through the PDCCH, the terminal 142 checks the CRC by using the RNTI corresponding to the terminal 142, and when a confirmation result of the CRC is correct, the terminal 142 may determine that the DCI is transmitted to the terminal 142. A demodulation reference signal (DMRS) for the PDCCH may be included in the PDCCH, and the terminal 142 may estimate a channel experienced by the PDCCH by using the DMRS and may receive the DCI.

Based on the DCI, the base station 140 may transmit DL data through a physical downlink shared channel (PDSCH) to the terminal 142 (operation 155). A DMRS may be included in the PDSCH, and the terminal 142 may estimate a channel experienced by the PDSCH by using the DMRS and may receive the DL data. The terminal 142 may attempt to decode the DL data, and when data decoding succeeds, the terminal 142 may transmit information indicating decoding success (acknowledgement (ACK) information) to the base station 140 so that the base station 140 transmits new data, and when data decoding fails, the terminal 142 may transmit information indicating decoding failure (negative acknowledgement (NACK) information) to the base station 140 so that the base station 140 retransmits corresponding data in a physical layer. The ACK/NACK information that is feedback information may be transmitted through a physical uplink control channel (PUCCH) or a physical uplink shared channel (PUSCH) (operation 160). When feedback information for data is transmitted through the PUCCH, PUCCH resources distinguishable by at least one of time, frequency, or code used for feedback information transmission may be determined by DCI for scheduling the data and higher layer signaling. In detail, the PUCCH resources may be resources in which a PDCCH resource set is configured through higher layer signaling, and one resource among the PUCCH resources may be indicated by DCI.

When the terminal 142 transmits NACK information as feedback information, the base station 140 may transmit DCI for scheduling retransmission data, and may retransmit data according to scheduling (operation 165). The terminal 142 may improve data reception performance by combining the retransmitted data with the data whose decoding fails, through hybrid automatic repeat request (HARQ).

Also, the base station 140 may transmit DCI for scheduling UL data transmission (which may be interchangeably used with UL grant) through the PDCCH to the terminal 142 (operation 170). The DCI may be DCI format 0_0 or 0_1, and the DCI format 0_1 may include information as shown in Table 2. However, the disclosure is not limited to the following examples.

TABLE 2

Carrier indicator- 0 or 3 bits
UL/SUL indicator - 0 or 1 bit
Identifier for DCI formats - [1] bits
Bandwidth part indicator- 0, 1 or 2 bits
Frequency domain resource assignment
    For resource allocation type 0 $\lceil N_{RB}^{UL,BWP} / P \rceil$ bits
    For resource allocation type 1,
    $\lceil \log_2(N_{RB}^{UL,BWP} (N_{RB}^{UL,BWP} + 1)/2) \rceil$ bits
Time domain resource assignment -1, 2, 3, or 4 bits
VRB-to-PRB mapping- 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits TABLE 2-continued SRS resource indicator - $\left\lceil \log_2\left(\sum_{k=1}^{L_{mas}} \binom{N_{SRS}}{k}\right)\right\rceil$ or $\lceil \log_2(N_{SRS})\rceil$ bits $\left\lceil \log_2\left(\sum_{k=1}^{L_{mas}} \binom{N_{SRS}}{k}\right)\right\rceil$ bits for non-codebook based PUSCH transmission;

$\lceil \log_2(N_{SRS})\rceil$ bits for codebook based PUSCH transmission.
Precoding information and number of layers -up to 6 bits
Antenna ports - up to 5 bits
SRS request - 2 bits
CSI request - 0, 1, 2, 3, 4, 5, or 6 bits
CBG transmission information- 0, 2, 4, 6, or 8 bits
PTRS-DMRS association - 0 or 2 bits.
beta_offset indicator - 0 or 2 bits
DMRS sequence initialization- 0 or 1 bit The terminal 142 receiving the DCI may transmit UL data through the PUSCH according to the DCI (operation 175). In this case, a DMRS may be included in the PUSCH, and the base station 140 estimates a channel experienced by the PUSCH by using the DMRS and receives the UL data. The base station 140 may attempt to decode the UL data, and when data decoding fails, the base station 140 may generate DCI for scheduling retransmission of the UL data and may transmit the DCI through the PDCCH to the terminal 142 (operation 180). The terminal 142 may identify the DCI for scheduling retransmission by using a new data indicator (NDI) and an HARQ process number of the DCI for scheduling retransmission, and may retransmit the UL data by using a scheduled resource (operation 185).

Although data scheduling and data retransmission described with reference to FIG. 1B are applied to a Uu interface, the data scheduling and data retransmission may also be applied to sidelink communication.

FIG. 2 is a diagram illustrating V2X communication performed through a sidelink according to an embodiment of the disclosure.

Referring to FIG. 2, a unicast communication group 200 corresponds to a case where a transmission terminal UE1 202 or UE2 204 and a reception terminal UE2 204 or UE1 202 perform one-to-one communication.

Also, a groupcast or multicast communication group 210 corresponds to a case where a transmission terminal and a reception terminal perform one-to-many communication. In groupcast, terminals UE1, UE2, and UE3 may form one group A 212 and may perform groupcast communication, and terminals UE4, UE5, UE6, and UE7 may form a group B 214 and may perform groupcast communication. Each terminal may perform groupcast communication within a group to which the terminal belongs, and communication with a terminal in a different group may also be performed by using a unicast, groupcast, or broadcast communication method. Although two groups are formed in FIG. 2, the disclosure is not limited thereto.

Although not shown in FIG. 2, V2X terminals may perform broadcast communication. The term "broadcast communication" may refer to a case where all V2X terminals receive data and control information transmitted by a V2X transmission terminal through a sidelink. For example, in the communication group 210, when the terminal UE1 is a transmission terminal for broadcast, the other terminals UE2, UE3, UE4, UE5, UE6, and UE7 may receive data and control information transmitted by the terminal UE1.

In NR V2X, unlike in LTE V2X, consideration may be given to supporting a transmission type where a vehicle terminal transmits data only to one specific terminal through unicast and a transmission type where a vehicle terminal transmits data to specific multiple terminals through groupcast. For example, when a service scenario such as platooning that is technology of connecting two or more vehicles through one network in groups of vehicles that travel close together is considered, unicast and groupcast may be usefully used. Specifically, a leader terminal in groups connected by platooning may need unicast communication for the purse of controlling one specific terminal and may need groupcast communication for the purpose of simultaneously controlling a group of specific multiple terminals.

There may be two resource allocation modes in a V2X system as follows. A first resource allocation mode is a scheduled resource allocation method in which a base station allocates resources used for sidelink transmission to RRC-connected terminals by using dedicated scheduling. In NR and LTE systems, mode 1 and mode 3 may correspond to the first resource allocation mode. Because the base station may manage the sidelink resources, the scheduled resource allocation method may be effective for interference management and resource pool management (dynamic allocation and/or semi-persistent transmission). When there is data to be transmitted to other terminal(s), the RRC-connected terminals may transmit, to the base station, information indicating that there is data to be transmitted to the other terminal(s) by using an RRC message or a medium access control (MAC) control element (CE). The RRC message may be sidelink terminal information (SidelinkUEInformation) and terminal assistance information (UEAssistanceInformation), and the MAC CE may include a buffer status report (BSR) MAC CE including at least one of an indicator indicating that a report is a BSR for V2X communication or information about a size of data buffered for sidelink communication, but the disclosure is not limited to the above examples.

A second resource allocation mode is a UE autonomous resource selection method in which a base station provides sidelink transmission/reception resource pools for V2X to a terminal by using system information or an RRC message (e.g., an RRC reconfiguration message or a PC5-RRC message) and the terminal selects a resource pool according to determined rules. In NR and LTE systems, mode 2 and mode 4 may correspond to the second resource allocation mode. The UE autonomous resource selection method may correspond to at least one of the following resource allocation methods. However, the disclosure is not limited to the following examples.

UE autonomously selects sidelink resource for transmission

UE assists sidelink resource selection for other UEs

UE is configured with NR configured grant for sidelink transmission

UE schedules sidelink transmission of other UEs

According to an embodiment of the disclosure, examples of a resource selection method of a terminal may include a zone mapping method, a sensing-based resource selection method, and a random selection method. However, the disclosure is not limited to the above examples.

In addition, even when a terminal is located within a coverage of a base station, resource allocation or resource selection may not be performed in a scheduled resource allocation mode or a UE autonomous resource selection mode, and when resource allocation or resource selection may not be performed, the terminal may perform V2X sidelink communication through preconfigured sidelink transmission/reception resource pool.

According to an embodiment of the disclosure, in LTE-based broadcast-based sidelink communication, a radio bearer for packet transmission and a radio bearer for packet reception may be respectively arbitrarily configured at a transmission terminal and a reception terminal. In NR-based sidelink communication, a sidelink radio bearer may be configured by a base station or a system. When it is determined that a terminal is within a coverage of the base station, the terminal may obtain a sidelink radio bearer configuration from the base station or the system. When it is determined that the terminal is not within the coverage of the base station, the terminal may obtain a preconfigured sidelink radio bearer configuration from the base station or the system.

According to an embodiment of the disclosure, when a base station or a system configures a sidelink radio bearer, the base station or the system may use QoS information that may correspond to the sidelink radio bearer. The QoS information that may correspond to the sidelink radio bearer may be provided from a terminal or an application server.

A case where it is determined that a terminal may not obtain a sidelink radio bearer configuration from a base station or a system will be described through various embodiments of the disclosure. The case where it is determined that the terminal may not obtain the sidelink radio bearer configuration may include at least one of a case where the terminal provides QoS information to the base station but it is determined that the terminal may not obtain a corresponding sidelink radio bearer configuration from the base station, a case where the terminal provides QoS information to the base station but it is determined that the terminal may not obtain a corresponding sidelink radio bearer configuration within a certain time from the base station, or a case where it is determined that the terminal may not obtain preconfigured sidelink radio bearer information. However, the disclosure is not limited to the above examples.

Figure 3:
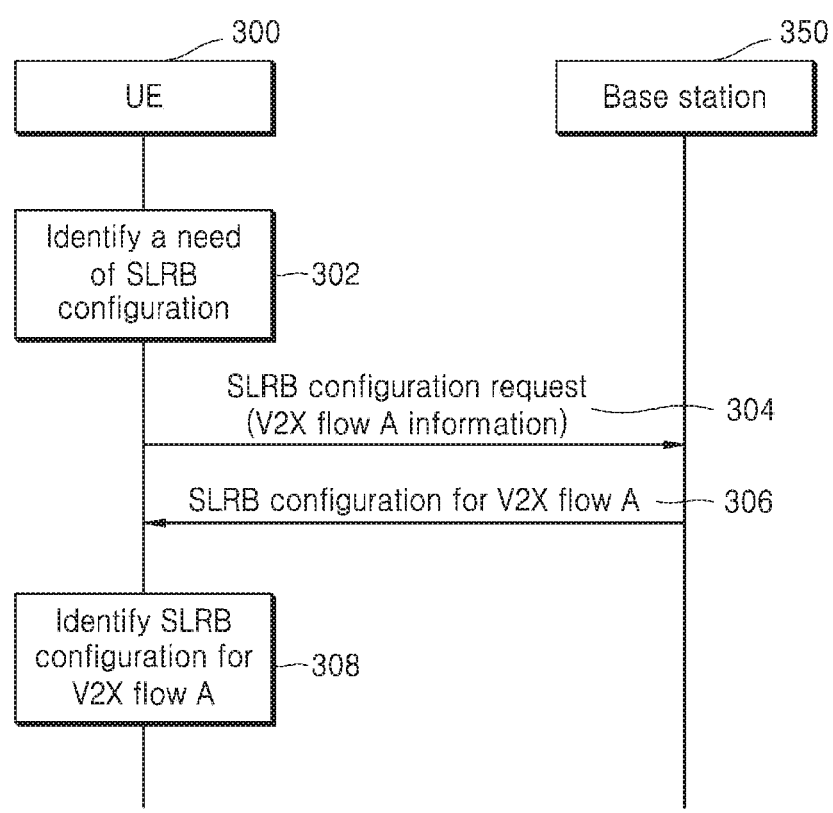
FIG. 3 is a diagram illustrating a signal flow between a terminal and a base station for obtaining a sidelink radio bearer configuration, according to an embodiment of the disclosure.

FIG. 3 illustrates a signal flow between a terminal and a base station for obtaining a sidelink radio bearer configuration according to an embodiment of the disclosure.

Referring to FIG. 3, in operation 302, a UE 300 may identify (or determine or recognize) a need of a sidelink radio bearer (SLRB) configuration for a V2X flow. The need of the SLRB configuration in operation 302 may correspond to at least one of a case where it is determined that a new packet has been generated in a V2X application, a case where it is determined that a new V2X application has been generated, a case where it is determined that a new V2X flow has occurred, or a case where it is determined that a new V2X flow has occurred, an already obtained SLRB configuration may not be used, and a new SLRB configuration is required. However, the disclosure is not limited to the above examples.

When it is determined in operation 302 that the already obtained SLRB configuration for the V2X flow may be used, the UE 300 may use a preconfigured sidelink radio bearer for the V2X flow. When it is determined that a new SLRB configuration is required, in operation 304, the UE 300 may transmit an SLRB configuration request message including QoS information for the V2X flow to a base station 350. According to an embodiment of the disclosure, the QoS information may include at least one of a 5G QoS identifier (5QI), a ProSe QoS identifier (PQI), a ProSe flow identifier (PFI), an application identifier, a service identifier, a cast type, a destination identifier, or a frequency identifier.

In operation 306, the base station 350 may determine an SLRB configuration corresponding to the QoS information of the V2X flow, and may transmit a response message to the UE 300.

In operation 308, the UE 300 may obtain SLRB configuration information for the V2X flow requested in operation 304, through information received in operation 306. The SLRB configuration information obtained in operation 308 may include information about at least one sidelink radio bearer for transmitting/receiving a V2X packet for the VX flow that requests the QoS information.

According to an embodiment of the disclosure, when the UE 300 performs unicast-based sidelink data transmission/reception with another UE, the UE 300 may use the sidelink radio bearer obtained in operation 308. Also, when the UE 300 performs a groupcast-based sidelink data transmission/reception with UEs of a specific group, the UE 300 may use the sidelink radio bearer obtained in operation 308. Also, when the UE 300 performs broadcast-based sidelink data transmission/reception, the UE 300 may use the sidelink radio bearer obtained in operation 308.

Figure 4:
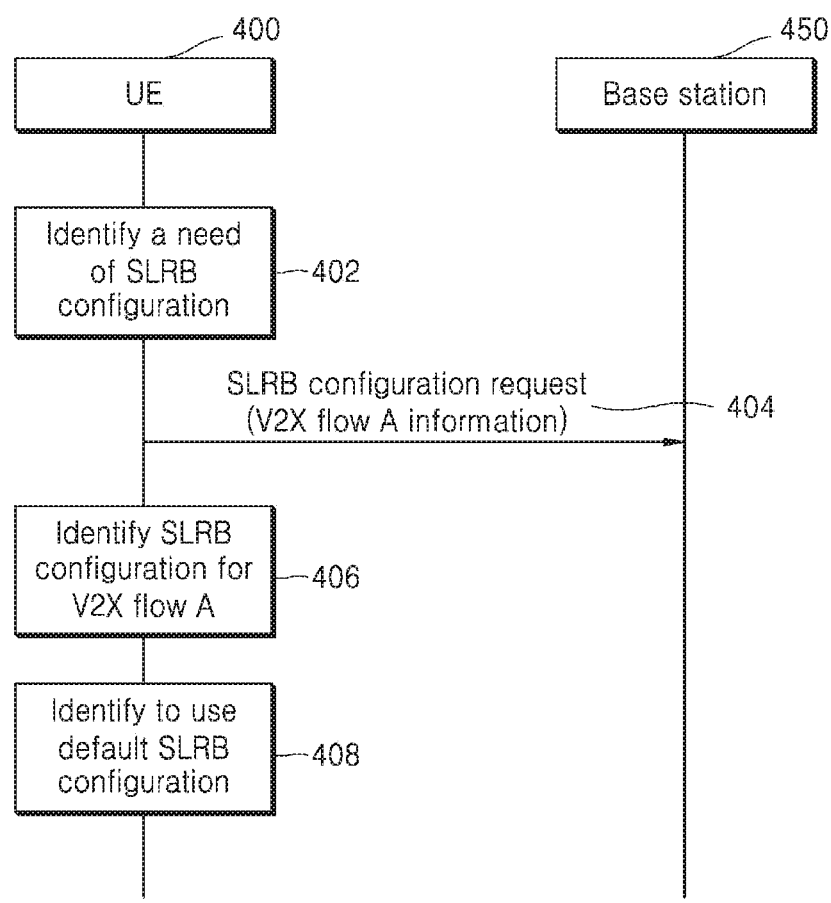
FIG. 4 is a diagram illustrating a signal flow when a terminal determines a default sidelink radio bearer (SLRB) configuration, according to an embodiment of the disclosure.

FIG. 4 illustrates a signal flow when a terminal determines a default SLRB configuration according to an embodiment of the disclosure.

Referring to FIG. 4, in operation 402, a UE 400 may identify (or determine or recognize) a need of an SLRB configuration for a V2X flow. The need of the SLRB configuration in operation 402 may correspond to at least one of a case where it is determined that a new packet has been generated in a V2X application, a case where it is determined that a new V2X application has been generated, a case where it is determined that a new V2X flow has occurred, or a case where it is determined that a new V2X flow has occurred, an already obtained SLRB configuration may not be used, and a new SLRB configuration is required. However, the disclosure is not limited to the above examples.

When it is determined in operation 402 that the already obtained SLRB configuration for the V2X flow may be used, the UE 400 may use a preconfigured sidelink radio bearer for the V2X flow. When it is determined that a new SLRB configuration is required, in operation 404, the UE 400 may transmit an SLRB configuration request message including QoS information for the V2X flow to a base station 450. According to an embodiment of the disclosure, the QoS information may include at least one of a 5G QoS identifier (5QI), a ProSe QoS identifier (PQI), a ProSe flow identifier (PFI), an application identifier, a service identifier, a cast type, a destination identifier, or a frequency identifier. However, the disclosure is not limited to the above examples.

In operation 406, the UE 400 may determine that SLRB configuration information for the V2X flow requested in operation 404 has not been obtained. For example, when the SLRB configuration information for the V2X flow is not obtained from the base station 450 for a certain time (e.g., until a timer x expires) after the sidelink radio bearer request message is transmitted in operation 404, the UE 400 may determine that the SLRB configuration information has not been obtained.

In operation 408, the UE 400 may determine to use a default SLRB configuration for the V2X flow.

According to an embodiment of the disclosure, when the UE 400 performs unicast-based sidelink data transmission/reception with another UE, the UE 400 may use the default sidelink radio bearer obtained in operation 408. Also, when the UE 400 performs groupcast-based sidelink data transmission/reception with UEs of a specific group, the UE 400 may use the default sidelink radio bearer obtained in operation 408. Also, when the UE 400 performs broadcast-based sidelink data transmission/reception, the UE 400 may use the default sidelink radio bearer obtained in operation 408.

According to an embodiment of the disclosure, when it is determined that the UE 400 receives the SLRB configuration information for the V2X flow from the base station 450 while using the default sidelink radio bearer, the UE 400 may stop using the default sidelink radio bearer for the V2X flow and may perform data transmission/reception by using a sidelink radio bearer received from the base station 450.

Also, according to an embodiment of the disclosure, the UE 400 is performing unicast-based sidelink data transmission/reception with another UE and the other UE has to know a sidelink radio bearer change, a sidelink radio bearer change procedure between the UE 400 and the other UE may be performed. After the other UE transmits an acknowledgement message for the sidelink radio bearer change procedure to the UE 400, the UE 400 and the other UE may perform unicast-based sidelink data transmission/reception by using a changed sidelink radio bearer.

According to an embodiment of the disclosure, a default sidelink radio bearer may be configured by using at least one method of Table 3. However, the disclosure is not limited to the following examples.

TABLE 3

Same configuration for all cast modes (unicast, groupcast, and broadcast)
Configuration for each cast mode
Configuration for unicast, and groupcast/broadcast
Configuration for PC5 RRC
Configuration for PC5 data Configuration parameters of a default sidelink radio bearer may include at least one of the following examples. However, the disclosure is not limited to the following examples.

TX parameter, synch parameter, resource pool, priority, V2X flow and TX parameter mapping, V2X flow and RX parameter mapping, resource allocation parameter (mode 1 resource allocation), and resource selection parameter (mode 2 resource allocation)

Figure 5:
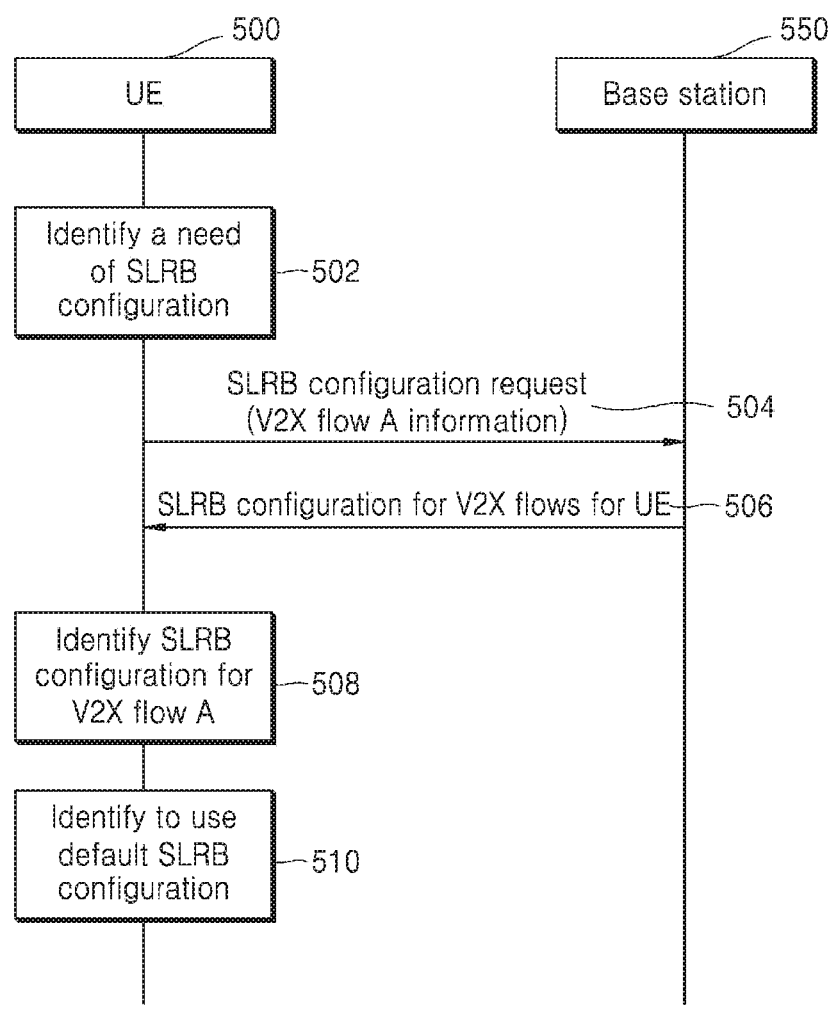
FIG. 5 is a diagram illustrating a signal flow when a terminal determines a default SLRB configuration, according to an embodiment of the disclosure.

FIG. 5 illustrates a signal flow when a terminal determines a default SLRB configuration according to an embodiment of the disclosure.

Referring to FIG. 5, in operation 502, a UE 500 may identify (or determine or recognize) a need of an SLRB configuration for a V2X flow. The need of the SLRB configuration in operation 502 may correspond to at least one of a case where it is determined that a new packet has been generated in a V2X application, a case where it is determined that a new V2X application has been generated, a case where it is determined that a new V2X flow has occurred, or a case where it is determined that a new V2X flow has occurred, an already obtained SLRB configuration may not be used, and a new SLRB configuration is required. However, the disclosure is not limited to the above examples.

When it is determined in operation 502 that the already obtained SLRB configuration for the V2X flow may be used, the UE 500 may use a preconfigured sidelink radio bearer for the V2X flow. When it is determined that a new SLRB configuration is required, in operation 504, the UE 500 may transmit an SLRB configuration request message including QoS information for the V2X flow to a base station 550. According to an embodiment of the disclosure, the QoS information may include at least one of a 5G QoS identifier (5QI), a ProSe QoS identifier (PQI), a ProSe flow identifier (PFI), an application identifier, a service identifier, a cast type, a destination identifier, or a frequency identifier. However, the disclosure is not limited to the above examples.

In operation 506, the base station 550 may transmit a response message to a request of the UE 500. According to an embodiment of the disclosure, the response message of operation 506 may not include SLRB configuration information for the V2X flow requested by the UE 500. In operation 508, the UE 500 may determine that the SLRB configuration information for the V2X flow requested in operation 504 has not been obtained. A condition under which the UE 500 determines that the requested SLRB configuration information for the V2X flow has not been obtained may correspond to at least one of a case where all SLRB configuration information for the V2X flow requested in operation 504 is not received or a case where some SLRB configuration information for the V2X flow requested in operation 504 is not received. However, the disclosure is not limited to the above examples.

In operation 510, the UE 500 may determine to use a default SLRB configuration for the V2X flow when it is determined that the SLRB configuration information is not received.

According to an embodiment of the disclosure, the response message of operation 506 may be a message indicating to use a default sidelink radio bearer as the SLRB configuration information for the V2X flow requested by the UE 500. The UE 500 may determine that the default sidelink radio bearer is configured as the SLRB configuration information for the V2X flow requested in operation 504 and may determine to use the default sidelink radio bearer for the V2X flow, as in operation 510.

According to an embodiment of the disclosure, when the UE 500 performs unicast-based sidelink data transmission/reception with another UE, the UE 500 may use the default sidelink radio bearer obtained in operation 510. Also, when the UE 500 performs groupcast-based sidelink data transmission/reception with UEs of a specific group, the UE 500 may use the default sidelink radio bearer obtained in operation 510. Also, when the UE 500 performs broadcast-based sidelink data transmission/reception, the UE 500 may use the default sidelink radio bearer obtained in operation 510.

According to an embodiment of the disclosure, when it is determined that the UE 500 receives the SLRB configuration information for the V2X flow from the base station 550 while using the default sidelink radio bearer, the UE 500 may stop using the default sidelink radio bearer for the V2X flow and may perform data transmission/reception by using a sidelink radio bearer received from the base station 550.

Also, according to an embodiment of the disclosure, when the UE 500 is performing unicast-based sidelink data transmission/reception with another UE and the other UE has to know a sidelink radio bearer change, a sidelink radio bearer change procedure between the UE 500 and the other UE may be performed. After the other UE transmits an acknowledgement message for the sidelink radio bearer change procedure to the UE 500, the UE 500 and the other UE may perform unicast-based sidelink data transmission/reception by using a changed sidelink radio bearer.

Figure 6:
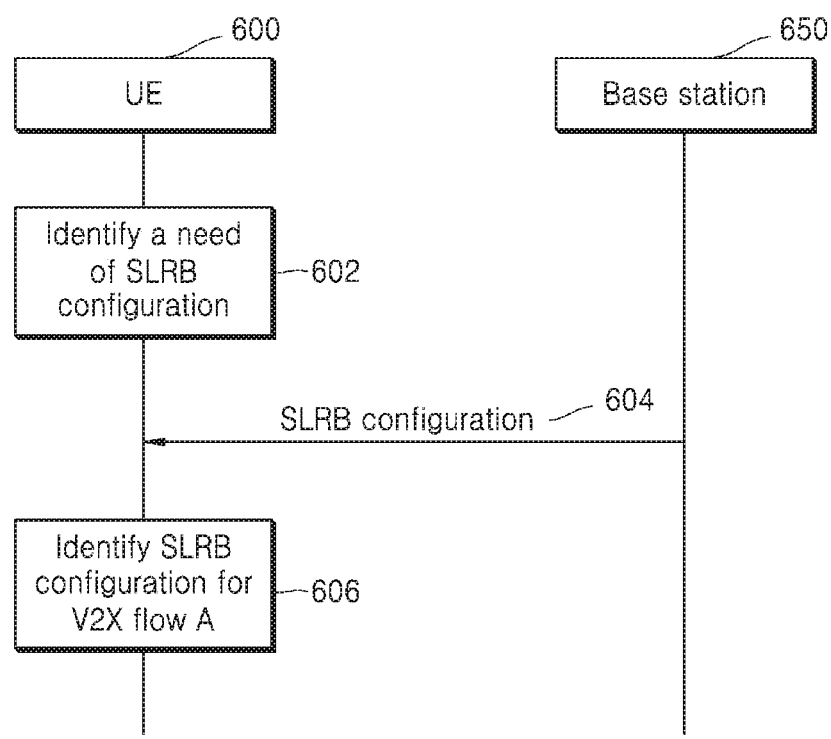
FIG. 6 is a diagram illustrating a signal flow when a terminal determines an SLRB configuration, according to an embodiment of the disclosure.

FIG. 6 illustrates a signal flow when a terminal determines an SLRB configuration according to an embodiment of the disclosure.

Referring to FIG. 6, in operation 602, a UE 600 may identify (or determine or recognize) a need of an SLRB configuration for a V2X flow. The need of the SLRB configuration in operation 602 may correspond to at least one of a case where it is determined that a new packet has been generated in a V2X application, a case where it is determined that a new V2X application has been generated, a case where it is determined that a new V2X flow has occurred, or a case where it is determined that a new V2X flow has occurred, an already obtained SLRB configuration may not be used, and a new SLRB configuration is required. However, the disclosure is not limited to the above examples.

When it is determined in operation 602 that the already obtained SLRB configuration for the V2X flow may be used, the UE 600 may use a preconfigured sidelink radio bearer for the V2X flow. When it is determined that a new SLRB configuration is required, in operation 604, the UE 600 may obtain SLRB configuration information for the V2X flow transmitted by a base station 650. The SLRB configuration information may include an SLRB configuration corresponding to QoS information for the V2X flow. According to an embodiment of the disclosure, the QoS information may include at least one of a 5G QoS identifier (5QI), a ProSe QoS identifier (PQI), a ProSe flow identifier (PFI), an application identifier, a service identifier, a cast type, a destination identifier, or a frequency identifier. However, the disclosure is not limited to the above examples.

According to an embodiment of the disclosure, SLRB configuration information corresponding to the QoS information for the V2X flow may be included in a system information block (SIB) message transmitted by the base station 650. In operation 606, the UE 600 may obtain the SLRB configuration information for the V2X flow requested by the UE 600, through information received in operation 604. The SLRB configuration information obtained in operation 606 may include information about at least one sidelink radio bearer for transmitting/receiving a V2X packet for the V2X flow that requests the QoS information.

According to an embodiment of the disclosure, when the UE 600 performs unicast-based sidelink data transmission/reception with another UE, the UE 600 may use the sidelink radio bearer obtained in operation 606. Also, when the UE 600 performs groupcast-sidelink data transmission/reception with UEs of a specific group, the UE 600 may use the sidelink radio bearer obtained in operation 606. Also, when the UE 600 performs broadcast-based sidelink data transmission/reception, the UE 600 may use the sidelink radio bearer obtained in operation 606.

Figure 7A:
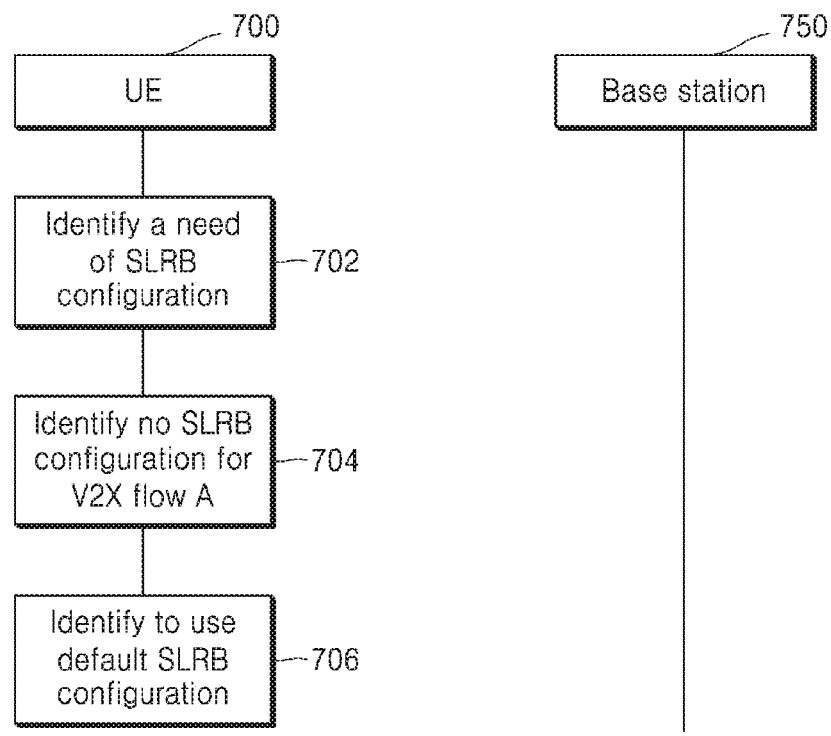
FIG. 7A is a diagram illustrating a signal flow when a terminal determines an SLRB configuration, according to an embodiment of the disclosure.

FIG. 7A illustrates a signal flow when a terminal determines an SLRB configuration according to an embodiment of the disclosure, and FIG. 7B illustrates a signal flow when a terminal determines an SLRB configuration according to an embodiment of the disclosure.

Referring to FIG. 7A, in operation 702, a UE 700 may identify (or determine or recognize) a need of an SLRB configuration for a V2X flow. The need of the SLRB configuration in operation 702 may correspond to at least one of a case where it is determined that a new packet has been generated in a V2X application, a case where it is determined that a new V2X application has been generated, a case where it is determined that a new V2X flow has occurred, or a case where it is determined that a new V2X flow has occurred, an already obtained SLRB configuration may not be used, and a new SLRB configuration is required. However, the disclosure is not limited to the above examples.

When it is determined in operation 702 that the already obtained SLRB configuration for the V2X flow may be used, the UE 700 may use a preconfigured sidelink radio bearer for the V2X flow. When it is determined that a new SLRB configuration is required, in operation 704, the UE 700 may determine that SLRB configuration information for the V2X flow transmitted by a base station 750 has not been obtained. When it is determined in operation 704 that the SLRB configuration information for the V2X flow is not obtained from the base station 750 for a certain time (e.g., until a timer x expires), the UE 700 may determine that the SLRB configuration information has not been obtained. For example, when an SIB message including configuration information required for V2X communication is not received from the base station 750, the UE 700 may determine that the SLRB configuration information has not been obtained.

According to an embodiment of the disclosure, the SLRB configuration information may include an SLRB configuration corresponding to QoS information for the V2X flow. The QoS information may include at least one of a 5G QoS identifier (5QI), a ProSe QoS identifier (PQI), a ProSe flow identifier (PFI), an application identifier, a service identifier, a cast type, a destination identifier, or a frequency identifier.

In operation 706, the UE 700 may determine to use a default SLRB configuration for the V2X flow.

According to an embodiment of the disclosure, when the UE 700 performs unicast-based sidelink data transmission/reception with another UE, the UE 700 may use a default sidelink radio bearer obtained in operation 706. Also, when the UE 700 performs groupcast-based sidelink data transmission/reception with UEs of a specific group, the UE 700 may use the default sidelink radio bearer obtained in operation 706. Also, when the UE 700 performs broadcast-based sidelink data transmission/reception, the UE 700 may use the default sidelink radio bearer obtained in operation 706. Configuration information of the default sidelink radio bearer may include Table 3.

According to an embodiment of the disclosure, when it is determined that the UE 700 receives the SIB message including the SLRB configuration information for the V2X flow from the base station 750 while using the default sidelink radio bearer, the UE 700 may stop using the default sidelink radio bearer for the V2X flow and may perform data transmission/reception by using a sidelink radio bearer received from the base station 750.

According to an embodiment of the disclosure, when the UE 700 is performing unicast-based sidelink data transmission/reception with another UE and the other UE has to know a sidelink radio bearer change, a sidelink radio bearer change procedure between the UE 700 and the other UE may be performed. After the other UE transmits an acknowledgement message for the sidelink radio bearer change procedure to the UE 700, the UE 700 and the other UE may perform unicast-based sidelink data transmission/reception by using a changed sidelink radio bearer.

Also, according to an embodiment of the disclosure, when the UE 700 determines that the SIB message including the configuration information required for V2X communication is not received from the base station 750 as in operation 704, the UE 700 may request the base station 750 to transmit the SIB message including the configuration information required for V2X communication, which will be described in more detail with reference to FIG. 7B.

Referring to FIG. 7B, in operation 752, the UE 700 may identify (or determine or recognize) a need of an SLRB configuration for a V2X flow. The need of the SLRB configuration in operation 752 may correspond to at least one of a case where it is determined that a new packet has been generated in a V2X application, a case where it is determined that a new V2X application has been generated, a case where it is determined that a new V2X flow has occurred, or a case where it is determined that a new V2X flow has occurred, an already obtained SLRB configuration may not be used, and a new SLRB configuration is required. However, the disclosure is not limited to the above examples.

When it is determined in operation 752 that the already obtained SLRB configuration for the V2X flow may be used, the UE 700 may use a preconfigured sidelink radio bearer for the V2X flow. When it is determined that a new SLRB configuration is required, in operation 754, the UE 700 may determine that an SIB message including configuration information required for V2X communication is not received from the base station 750 and may determine that SLRB configuration information for the V2X flow transmitted by the base station 750 has not been obtained.

According to an embodiment of the disclosure, the SLBR configuration information may include an SLRB configuration corresponding to QoS information for the V2X flow. Also, the QoS information may include at least one of a 5G QoS identifier (5QI), a ProSe QoS identifier (PQI), a ProSe flow identifier (PFI), an application identifier, a service identifier, a cast type, a destination identifier, or a frequency identifier. However, the disclosure is not limited to the above examples.

In operation 756, the UE 700 may request the base station 750 to transmit the SIB message including the configuration information required for V2X communication. In operation 758, the base station 750 may transmit, to the UE 700, a message including V2X configuration information in response to the request of the UE 700.

In operation 760, the UE 700 may determine whether the V2X configuration information received in operation 758 includes the requested SLRB configuration information for the V2X flow. When it is determined that the requested SLRB configuration information for the V2X flow is received, the UE 700 may perform V2X packet transmission/reception by using the SLRB configuration information. The SLRB configuration information received from the base station 750 may include at least one of a general SLRB configuration or a default SLRB configuration. However, the disclosure is not limited to the above examples.

According to an embodiment of the disclosure, the default SLRB configuration may refer to a preconfigured SLRB configuration at a time when the UE 700 connects to a network, and the general SLRB configuration may refer to a configuration of a sidelink radio bearer other than a default sidelink radio bearer and may refer to an SLRB configuration obtained through signaling from the base station 750. For example, it may be assumed that information as shown in Table 3 may be used as configuration information of a default sidelink radio bearer or configuration information of a general sidelink radio bearer. When the UE 700 determines that default SLRB configuration information is received as in operation 760, the UE 700 may configure a default sidelink radio bearer by using already obtained information of Table 3. When the UE 700 determines that information of Table 3 is received from the base station 750 as in operation 760, the UE 700 may configure a general sidelink radio bearer by using obtained information of Table 3. However, the disclosure is not limited to the above examples.

When it is determined in operation 760 that the requested SLRB configuration information for the V2X flow is not received, in operation 762, the UE 700 may determine to use the default SLRB configuration for the V2X flow.

According to an embodiment of the disclosure, when the UE 700 performs unicast-based sidelink data transmission/reception with another UE, the UE 700 may use the sidelink radio bearer determined in operation 706. Also, when the UE 700 performs groupcast-based sidelink data transmission/reception with UEs of a specific group, the UE 700 may use the sidelink radio bearer determined in operation 706. Also, when the UE 700 performs broadcast-based sidelink data transmission/reception, the UE 700 may use the sidelink radio bearer determined in operation 706. Configuration information of the default sidelink radio bearer may include Table 3.

FIG. 8 illustrates a signal flow when a terminal determines an SLRB configuration according to an embodiment of the disclosure.

Referring to FIG. 8, in operation 802, a UE 800 may identify (or determine or recognize) a need of an SLRB configuration for a V2X flow. The need of the SLRB configuration in operation 802 may correspond to at least one of a case where it is determined that a new packet has been generated in a V2X application, a case where it is determined that a new V2X application has been generated, a case where it is determined that a new V2X flow has occurred, or a case where it is determined that a new V2X flow has occurred, an already obtained SLRB configuration may not be used, and a new SLRB configuration is required. However, the disclosure is not limited to the above examples.

When it is determined in operation 802 that the already obtained SLRB configuration for the V2X flow may be used, the UE 800 may use a preconfigured sidelink radio bearer for the V2X flow. In operation 804, when it is determined that a new SLRB configuration is required, the UE 800 may obtain SLRB configuration information for the V2X flow transmitted by a base station 850. According to an embodiment of the disclosure, the SLRB configuration information may include an SLRB configuration corresponding to QoS information for the V2X flow. The QoS information may include at least one of a 5G QoS identifier (5QI), a ProSe QoS identifier (PQI), a ProSe flow identifier (PFI), an application identifier, a service identifier, a cast type, a destination identifier, or a frequency identifier. However, the disclosure is not limited to the above examples.

Also, according to an embodiment of the disclosure, SLRB configuration information corresponding to the QoS information for the V2X flow may be included in a system information block (SIB) message transmitted by the base station 850. However, the disclosure is not limited to the above examples.

According to an embodiment of the disclosure, the message of operation 804 may not include the SLRB configuration information for the V2X flow requested by the UE 800. In operation 806, the UE 800 may determine that the requested SLRB configuration information for the V2X flow has not been obtained. A condition under which the UE 800 determines that the requested SLRB configuration information for the V2X flow has not been obtained may correspond to at least one of a case where all requested SLRB configuration information for the V2X flow is not received or a case where some SLRB configuration information for the V2X flow is not received. However, the disclosure is not limited to the above examples.

In operation 808, the UE 800 may determine to use a default SLRB configuration for the V2X flow when it is determined that the SLRB configuration information is not received. Configuration information of the default sidelink radio bearer may include Table 3.

According to an embodiment of the disclosure, the SLRB configuration information in operation 804 may indicate to use the default sidelink radio bearer as the SLRB configuration information for the V2X flow requested by the UE 800. The UE 800 may determine that the default sidelink radio bearer is configured as the SLRB configuration information for the V2X flow requested in operation 802 and may determine to use the default sidelink radio bearer for the V2X flow, as in operation 808.

According to an embodiment of the disclosure, when the UE 800 performs unicast-based data transmission/reception with another UE, the UE 800 may use the default sidelink radio bearer obtained in operation 808. When the UE 800 performs groupcast-based sidelink data transmission/reception with UEs of a specific group, the UE 800 may use the default sidelink radio bearer obtained in operation 808. When the UE 800 performs broadcast-based sidelink data transmission/reception, the UE 800 use the default sidelink radio bearer obtained in operation 808.

According to an embodiment of the disclosure, when it is determined that the UE 800 receives the SLRB configuration information for the V2X flow from the base station 850 while using the default sidelink radio bearer, the UE 800 may stop using the default sidelink radio bearer for the V2X flow and may perform data transmission/reception by using a sidelink radio bearer received from the base station 850. When the UE 800 is performing unicast-based sidelink data transmission/reception with another UE and the other UE has to know a sidelink radio bearer change, a sidelink radio bearer change procedure between the UE 800 and the other UE may be performed. After the other UE transmits an acknowledgement message for the sidelink radio bearer change procedure to the UE 800, the UE 800 and the other UE may perform unicast-based sidelink data transmission/reception by using a changed sidelink radio bearer.

Figure 9:
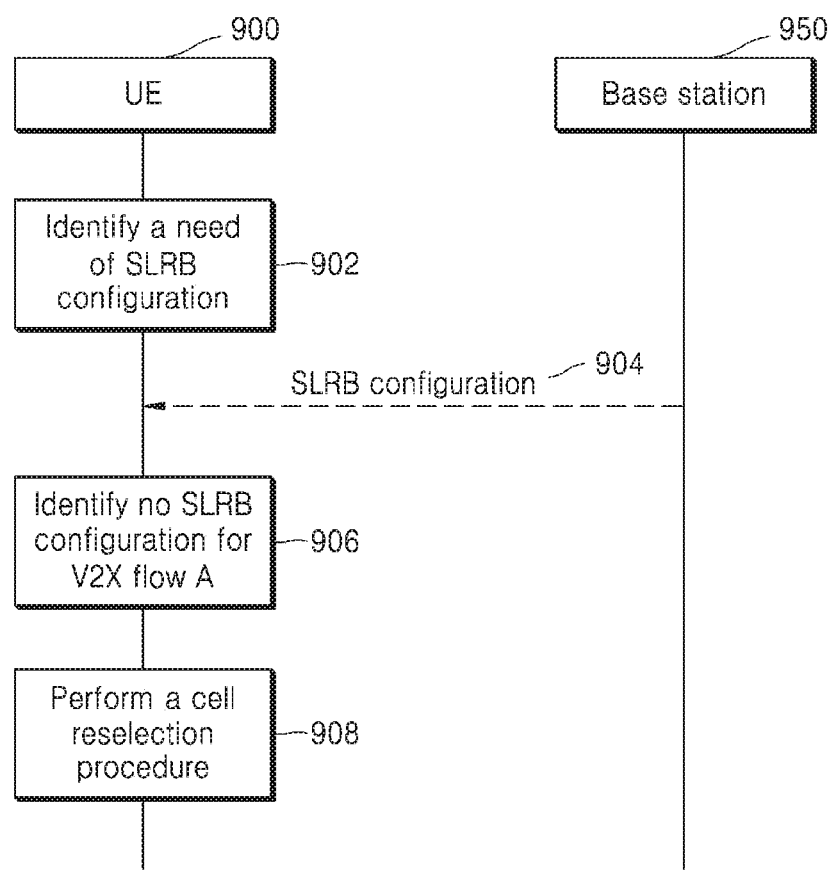
FIG. 9 is a diagram illustrating a signal flow when a terminal determines an SLRB configuration, according to an embodiment of the disclosure.

FIG. 9 illustrates a signal flow when a terminal determines an SLRB configuration according to an embodiment of the disclosure.

Referring to FIG. 9, in operation 902, a UE 900 may identify (or determine or recognize) a need of an SLRB configuration for a V2X flow. The need of the SLRB configuration in operation 902 may correspond to at least one of a case where it is determined that a new packet has been generated in a V2X application, a case where it is determined that a new V2X application has been generated, a case where it is determined that a new V2X flow has occurred, or a case where it is determined that a new V2X flow has occurred, an already obtained SLRB configuration may not be used, and a new SLRB configuration is required. However, the disclosure is not limited to the above examples.

When it is determined in operation 902 that the already obtained SLRB configuration for the V2X flow may be used, the UE 900 may use a preconfigured sidelink radio bearer for the V2X flow. When it is determined that a new SLRB configuration is required, in operation 904, the UE 900 may obtain SLRB configuration information for the V2X flow transmitted by a base station 950. According to an embodiment of the disclosure, the SLRB configuration information may include an SLRB configuration corresponding to QoS information for the V2X flow. The QoS information may include at least one of a 5G QoS identifier (5QI), a ProSe QoS identifier (PQI), a ProSe flow identifier (PFI), an application identifier, a service identifier, a cast type, a destination identifier, or a frequency identifier. However, the disclosure is not limited to the above examples.

According to an embodiment of the disclosure, SLRB configuration information corresponding to the QoS information for the V2X flow may be included in a system information block (SIB) message transmitted by the base station 950. Also, in operation 904, the SIB message transmitted by the base station 950 may not include the SLRB configuration information corresponding to the QoS information for the V2X flow.

In operation 906, the UE 900 may determine that the requested SLRB configuration information for the V2X flow has not been obtained. In operation 908, the UE 900 may perform a cell (re)selection procedure for (re)selecting a cell determined to obtain the requested SLRB configuration corresponding to the QoS information of the V2X flow.

According to an embodiment of the disclosure, the UE 900 may obtain requested sidelink radio bearer information for the V2X flow through the cell selected in the cell (re)selection procedure.

Also, according to an embodiment of the disclosure, the UE 900 may determine that the requested sidelink radio bearer information for the V2X flow may not be obtained through the cell selected in the cell (re)selection procedure. The UE 900 may determine to use a default sidelink radio bearer for the V2X flow until it is determined that a general sidelink radio bearer corresponding to the QoS information of the V2X flow may be obtained.

Figure 10:
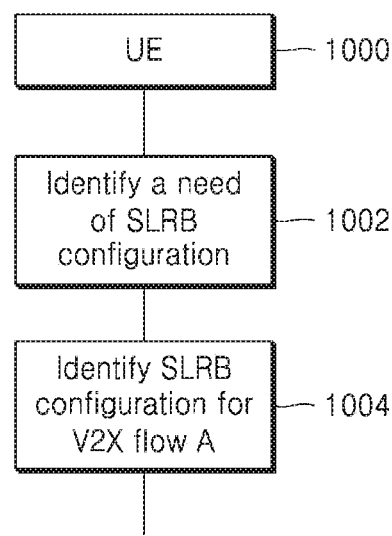
FIG. 10 is a diagram illustrating a signal flow when a terminal determines an SLRB configuration, according to an embodiment of the disclosure.

FIG. 10 illustrates a signal flow when a terminal determines an SLRB configuration according to an embodiment of the disclosure.

Referring to FIG. 10, in operation 1002, a UE 1000 may identify (or determine or recognize) a need of an SLRB configuration for a V2X flow. The need of the SLRB configuration in operation 1002 may correspond to at least one of a case where it is determined that a new packet has been generated in a V2X application, a case where it is determined that a new V2X application has been generated, a case where it is determined that a new V2X flow has occurred, or a case where it is determined that a new V2X flow has occurred, an already obtained SLRB configuration may not be used, and a new SLRB configuration is required. However, the disclosure is not limited to the above examples.

When it is determined in operation 1002 that the already obtained SLRB configuration for the V2X flow may be used, the UE 1000 may use a preconfigured sidelink radio bearer for the V2X flow. When it is determined that a new SLRB configuration is required, in operation 1004, the UE 1000 may determine whether requested SLRB configuration information for the V2X flow is obtained from preconfigured SLRB configuration information. According to an embodiment of the disclosure, the SLRB configuration information may include a SLRB configuration corresponding to QoS information for the V2X flow. The QoS information may include at least one of a 5G QoS identifier (5QI), a ProSe QoS identifier (PQI), a ProSe flow identifier (PFI), an application identifier, a service identifier, a cast type, a destination identifier, or a frequency identifier. However, the disclosure is not limited to the above examples.

According to an embodiment of the disclosure, the SLRB configuration information obtained in operation 1004 includes information about at least one sidelink radio bearer for transmitting/receiving a V2X packet for the V2X flow that requests the QoS information. When the UE 1000 performs unicast-based sidelink data transmission/reception with another UE, the UE 1000 may use the sidelink radio bearer obtained in operation 1004. When the UE 1000 performs groupcast-based sidelink data transmission/reception with UEs of a specific group, the UE 1000 may use the sidelink radio bearer obtained in operation 1004. When the UE 1000 performs broadcast-based sidelink data transmission/reception, the UE 1000 may use the sidelink radio bearer obtained in operation 1004.

Figure 11:
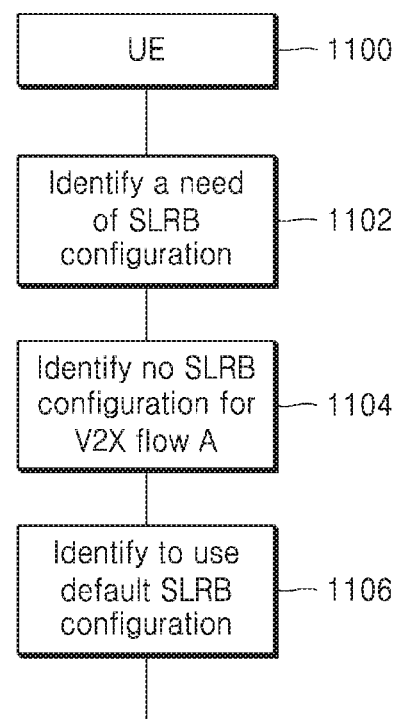
FIG. 11 is a diagram illustrating a signal flow when a terminal determines an SLRB configuration, according to an embodiment of the disclosure.

FIG. 11 illustrates a signal flow when a terminal determines an SLRB configuration according to an embodiment of the disclosure.

Referring to FIG. 11, a UE 1100 may identify (or determine or recognize) a need of an SLRB configuration for a V2X flow in operation 1102. The need of the SLRB configuration in operation 1102 may correspond to at least one of a case where it is determined that a new packet has been generated in a V2X application, a case where it is determined that a new V2X application has been generated, a case where it is determined that a new V2X flow has occurred, or a case where it is determined that a new V2X flow has occurred, an already obtained SLRB configuration may not be used, and a new SLRB configuration is required.

When it is determined in operation 1102 that the already obtained SLRB configuration for the V2X flow may be used, the UE 1100 may use a preconfigured sidelink radio bearer for the V2X flow. When it is determined that a new SLRB configuration is required, in operation 1104, the UE 1100 may determine whether requested SLRB configuration information for the V2X flow is obtained from preconfigured SLRB configuration information.

When the UE 1100 determines that the SLRB configuration information for the V2X flow is not obtained from the preconfigured SLRB configuration information in operation 1104, in operation 1106, the UE 1100 may determine whether to use a default SLRB configuration for the V2X flow. Configuration information of the default sidelink radio bearer may include Table 3.

According to an embodiment of the disclosure, it is indicated in operation 1104 to use the default sidelink radio bearer as the SLRB configuration information for the V2X flow requested by the UE 1100. The UE 1100 may determine to use the default sidelink radio bearer for the V2X flow.

According to an embodiment of the disclosure, when the UE 1100 performs unicast-based sidelink data transmission/reception with another UE, the UE 1100 may use the default sidelink radio bearer obtained in operation 1106. When the UE 1100 performs groupcast-based sidelink data transmission/reception with UEs of a specific group, the UE 1100 may use the default sidelink radio bearer obtained in operation 1106. When the UE 1100 performs broadcast-based sidelink data transmission/reception, the UE 1100 may use the default sidelink radio bearer obtained in operation 1106.

Also, according to an embodiment of the disclosure, a terminal may determine whether a general SLRB configuration or a default SLRB configuration is obtained from a base station or a system. The obtaining of the general SLRB configuration or the default SLRB configuration of the terminal may include a case where an SLRB configuration is preconfigured. The terminal may determine whether the general SLRB configuration obtained from the base station or the system satisfies QoS information corresponding to a V2X flow requested by the terminal. Information that may be used by the terminal as a criterion for determining whether the QoS information corresponding to the V2X flow is satisfied may include at least one of, for example, a 5QI, a PQI, a range requirement, or a data rate requirement. However, the disclosure is not limited to the above examples.

For example, when it is determined that at least one of a TX parameter, a resource allocation parameter, or a resource selection parameter which may satisfy a latency requirement of the V2X flow is included in the general SLRB configuration, the terminal may determine that the QoS information corresponding to the V2X flow is satisfied.

According to an embodiment of the disclosure, when it is determined that a general SLRB configuration obtained from a base station or a system does not satisfy QoS information corresponding to a V2X flow, a terminal may determine whether to use a default sidelink radio bearer or a general sidelink radio bearer obtained for the V2X flow. The terminal may determine to use a radio bearer configuration that most satisfies the QoS information corresponding to the V2X flow by comparing parameters of a default sidelink radio bearer configuration and the general SLRB configuration allocated by the base station or the system.

According to an embodiment of the disclosure, indication information with which a base station or a system configures a default sidelink radio bearer for a V2X flow requested by a terminal may be transmitted from the base station or the system to the terminal by using at least one of the following methods. However, the disclosure is not limited to the following examples.

- Default SLRB configuration indicator corresponding to a V2X flow included in an SLRB configuration message transmitted by a base station as a response to an SLRB configuration request message requested by a terminal to the base station
- Default SLRB configuration indicator corresponding to a V2X flow included in an SIB of an SLRB configuration message transmitted by a base station
- One or more V2X flows included in an SIB of an SLRB configuration message transmitted by a base station (in this case, because an SLRB configuration corresponding to a V2X flow is not specified, a terminal may implicitly determine that a default sidelink radio bearer is configured for the V2X flow)
- Default SLRB configuration indicator corresponding to a V2X flow included in preconfigured SLRB configuration information
- One or more V2X flows included in preconfigured SLRB configuration information (in this case, because an SLRB configuration corresponding to a V2X flow is not specified, a terminal may determine that a default sidelink radio bearer is configured for the V2X flow)

The above various embodiments of the disclosure describe a terminal operation using a default sidelink radio bearer for a V2X flow when it is determined that SLRB configuration information is not obtained from a base station or a system for the V2X flow requested by the terminal.

Also, according to an embodiment of the disclosure, a sidelink radio bearer may no longer be used while packet transmission/reception for a V2X flow is performed by obtaining SLRB configuration information from a base station or a system for the V2X flow requested by a terminal. When the sidelink radio bearer may no longer be used, the terminal may determine to perform packet transmission/reception by using a default sidelink radio bearer for the V2X flow.

According to an embodiment of the disclosure, a terminal may obtain sidelink radio bearer information to be used in a target base station for a V2X flow that is being used while performing a handover with a base station. The terminal may obtain sidelink radio bearer information to be used in a changed state for the V2X flow that is being used while performing a state transition from RRC_CONNECTED to RRC_IDLE/RRC_INACTIVE or from RRC_IDLE/RRC_INACTIVE to RRC_CONNECTED. When the terminal changes from base station IN-COVERAGE to base station OUT-OF-COVERAGE or changes from base station OUT-OF-COVERAGE to base station IN-COVERAGE, the terminal may obtain the sidelink radio bearer information to be used in the changed state for the V2X flow that is being used. According to an embodiment of the disclosure, the terminal may determine to use a default sidelink radio bearer for the V2X flow requested in at least one of the following exceptional cases. However, the disclosure is not limited to the following examples.

- Case where, when a terminal performs data transmission/reception by using a sidelink radio bearer configured by a serving base station for a V2X flow and then performs a handover to a target base station, the terminal determines that SLRB configuration information for the V2X flow is not obtained from the target base station
- Case where, when a terminal performs data transmission/reception by using a sidelink radio bearer configured by a serving base station for a V2X flow and then performs a handover to a target base station, the terminal determines that default SLRB configuration information for the V2X flow is received from the target base station
- Case where a terminal determines that an SLRB configuration to be used after a state transition (e.g., change from RRC_CONNECTED to RRC_IDLE/RRC_INACTIVE, change from RRC_IDLE/RRC_INACTIVE to RRC_CONNECTED, change from base station OUT-OF-COVERAGE to base station IN-COVERAGE, or change from base station IN-COVERAGE to base station OUT-OF-COVERAGE) for a V2X flow is not obtained
- Case where a terminal is indicated to use a default SLRB configuration after a state transition (e.g., change from RRC_CONNECTED to RRC_IDLE/RRC_INACTIVE, change from RRC_IDLE/RRC_INACTIVE to RRC_CONNECTED, change from base station OUT-OF-COVERAGE to base station IN-COVERAGE, or change from base station IN-COVERAGE to base station OUT-OF-COVERAGE) for a V2X flow
- Case where a terminal performs a handover to a target station or a state transition and then determines that a general SLRB configuration obtained for a V2X flow does not satisfy a QoS requirement corresponding to the V2X flow
- Case where, when a terminal performs a handover to a target base station or a state transition and then a general SLRB configuration obtained for a V2X flow does not satisfy a QoS requirement corresponding to the V2X flow, the terminal is allowed to arbitrarily use an SLRB configuration for the V2X flow According to various embodiments of the disclosure, when it is determined that a terminal has to change an SLRB configuration that is being used for a V2X flow with another counterpart terminal, an SLRB configuration change procedure for the V2X flow between the terminal and the other counterpart terminal may be performed.

Also, according to an embodiment of the disclosure, a case where a bi-directional SLRB configuration between two terminals that perform unicast-based V2X packet transmission/reception is required may be considered. When a bi-directional sidelink radio bearer is configured, a sidelink radio bearer may be configured for each terminal functioning as a transmission terminal, or one sidelink radio bearer may be configured for two terminals. When a sidelink radio bearer is configured for each of two terminals, each terminal may configure a sidelink radio bearer according to any of FIGS. 3 through 11. When one sidelink radio bearer is configured for two terminals, each terminal may perform a procedure (e.g., a coordination procedure or a negotiation procedure) of determining one sidelink radio bearer between two terminals besides a procedure according to any of FIGS. 3 through 11.

According to an embodiment of the disclosure, a procedure of determining one sidelink radio bearer may correspond to one of the following. However, the disclosure is not limited to the following examples.

- When a terminal obtains a default sidelink radio bearer and another terminal obtains a general sidelink radio bearer, determining to use the general sidelink radio bearer
- When a terminal obtains a default sidelink radio bearer and another terminal obtains a general sidelink radio bearer, determining to use a sidelink radio bearer that may most satisfy a QoS requirement of a V2X flow
- When two terminals respectively obtain general sidelink radio bearers and it is determined that configurations of the two general sidelink radio bearers are different from each other, determining to use a sidelink radio bearer that most satisfy a QoS requirement of a V2X flow
- When two terminals respectively obtain general sidelink radio bearers and it is determined that configurations of the two general sidelink radio bearers are the same, determining to use a corresponding sidelink radio bearer for a V2X flow
- When two terminals obtain default sidelink radio bearers, determining to use a default sidelink radio bearer for a V2X flow
- Determining to use a sidelink radio bearer obtained by a terminal that is designated to determine a sidelink radio bearer for a V2X flow from among two terminals Also, according to an embodiment of the disclosure, when a terminal determines priority information of a V2X flow or a sidelink radio bearer and may not simultaneously perform uplink and sidelink packet transmission/reception, the terminal may determine whether to first transmit an uplink packet or a sidelink packet. A terminal may obtain priority information of a V2X flow or a sidelink radio bearer through a base station or a system. The terminal may obtain a default priority information application indication for the V2X flow or the sidelink radio bearer through the base station or the system. Also, the terminal may obtain priority information of an uplink flow through the base station or the system. Also, the terminal may obtain a default priority information application indication for the uplink flow through the base station or the system. The terminal may determine a transmission priority between the V2X flow or the sidelink radio bearer and the uplink flow based on the priority information of the V2X flow or the sidelink radio bearer or the priority information of the uplink flow obtained from the base station or the system.

According to an embodiment of the disclosure, default priority information may be indicated to use a default sidelink radio bearer. According to various embodiments of the disclosure, default priority information may be indicated to use a general sidelink radio bearer. According to an embodiment of the disclosure, when priority information including a default priority is not indicated for a default sidelink radio bearer or a general sidelink radio bearer, a terminal may determine to use a default priority level corresponding to QoS information of a V2X flow.

Figure 12A:
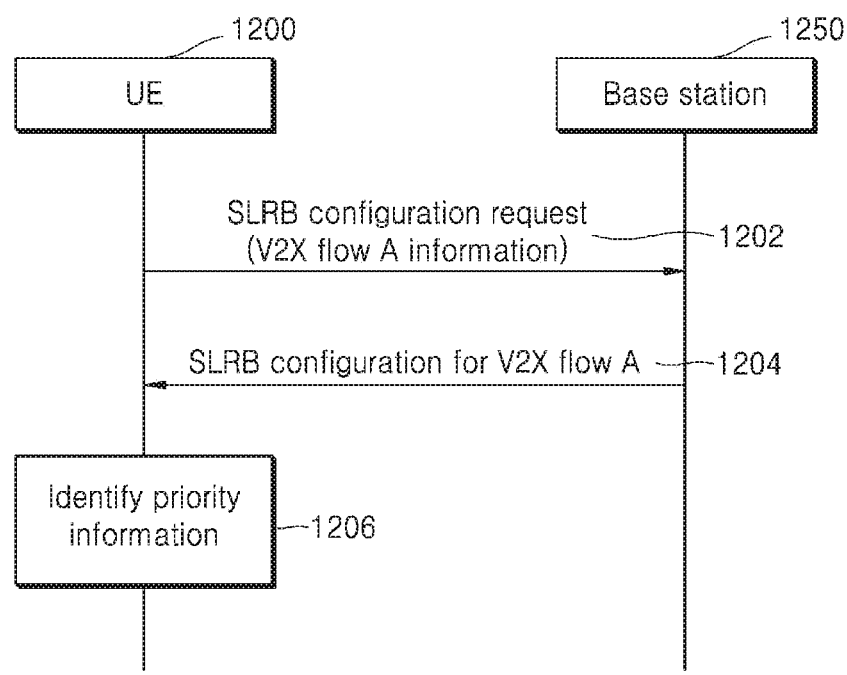
FIG. 12A is a diagram illustrating a signal flow when a terminal obtains priority information of a V2X flow, according to an embodiment of the disclosure.
Figure 12B:
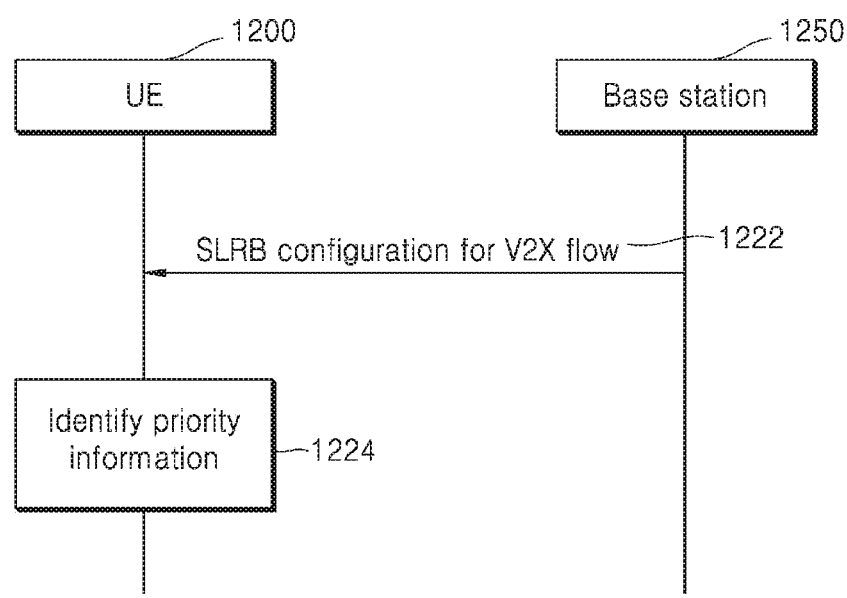
FIG. 12B is a diagram illustrating a signal flow when a terminal obtains priority information of a V2X flow, according to an embodiment of the disclosure.
Figure 12C:
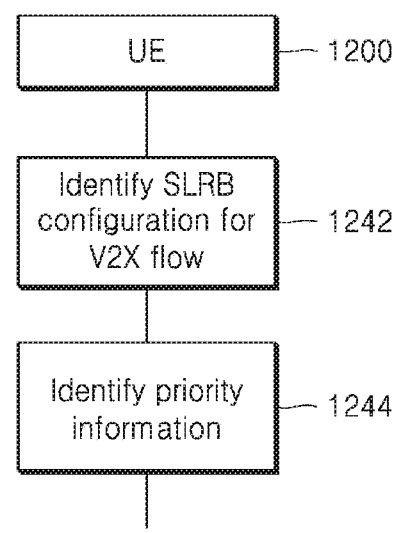
FIG. 12C is a diagram illustrating a signal flow when a terminal obtains priority information of a V2X flow, according to an embodiment of the disclosure.

FIG. 12A illustrates a signal flow of a terminal that obtains priority information of a V2X flow or a sidelink radio bearer according to an embodiment of the disclosure, FIG. 12B illustrates a signal flow of a terminal that obtains priority information of a V2X flow or a sidelink radio bearer according to an embodiment of the disclosure, and FIG. 12C illustrates a signal flow of a terminal that obtains priority information of a V2X flow or a sidelink radio bearer according to an embodiment of the disclosure.

Referring to FIG. 12A, in operation 1202, a UE 1200 may request an SLRB configuration for a V2X flow by transmitting an SLRB configuration request message to a base station 1250. In operation 1204, the base station 1250 may transmit SLRB configuration information for the V2X flow to the UE 1200 in response to the request of operation 1202. In operation 1206, the UE 1200 may determine the SLRB configuration for the V2X flow and priority information.

Referring to FIG. 12B, in operation 1222, the UE 1200 may receive an SLRB configuration message transmitted by the base station 1250. In operation 1224, the UE 1200 may determine the SLRB configuration for the V2X flow and the priority information based on information obtained in operation 1222.

Referring to FIG. 12C, in operation 1242, the UE 1200 may determine whether preconfigured SLRB configuration information is obtained. In operation 1244, the UE 1200 may determine the SLRB configuration for the V2X flow and the priority information based on the information obtained in operation 1242.

Figure 13A:
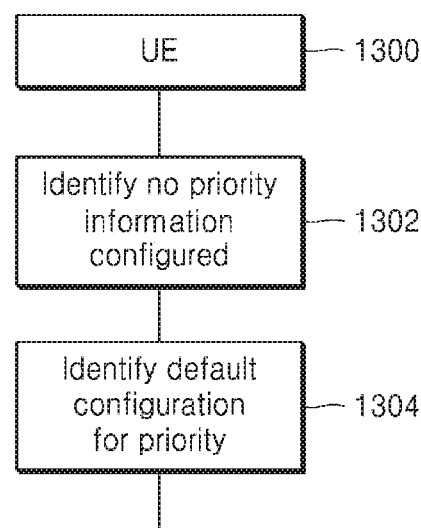
FIG. 13A is a diagram illustrating a signal flow of a terminal that obtains priority information of a V2X flow, according to an embodiment of the disclosure.
Figure 13B:
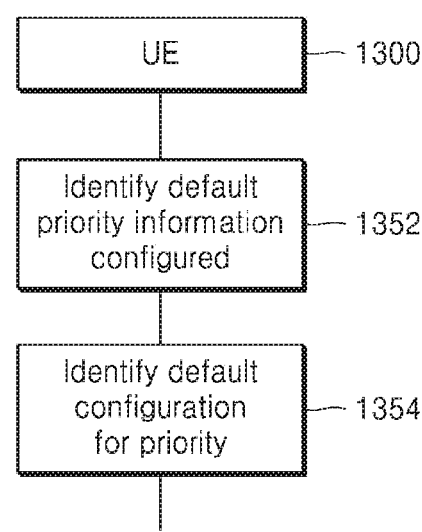
FIG. 13B is a diagram illustrating a signal flow of a terminal that obtains priority information of a V2X flow, according to an embodiment of the disclosure.

FIG. 13A illustrates a signal flow of a terminal that obtains priority information of a V2X flow or a sidelink radio bearer according to an embodiment of the disclosure, and FIG. 13B illustrates a signal flow of a terminal that obtains priority information of a V2X flow or a sidelink radio bearer according to an embodiment of the disclosure.

Referring to FIG. 13A, a UE 1300 may perform a procedure of obtaining priority information of a V2X flow or a sidelink radio bearer based on a procedure of each of FIGS. 12A, 12B, and 12C. In operation 1302, the UE 1300 may determine that the priority information of the V2X flow or the sidelink radio bearer is not obtained. In operation 1304, the UE 1300 may determine to use a default priority of the V2X flow or the sidelink radio bearer.

Referring to FIG. 13B, the UE 1300 may perform a procedure of obtaining priority information of a V2X flow or a sidelink radio bearer based on a procedure of each of FIGS. 12A, 12B, and 12C. In operation 1352, the UE 1300 may determine that default priority information is configured for the V2X flow or the sidelink radio bearer. In operation 1354, the UE 1300 may determine to use the default priority information for the V2X flow or the sidelink radio bearer.

Figure 14:
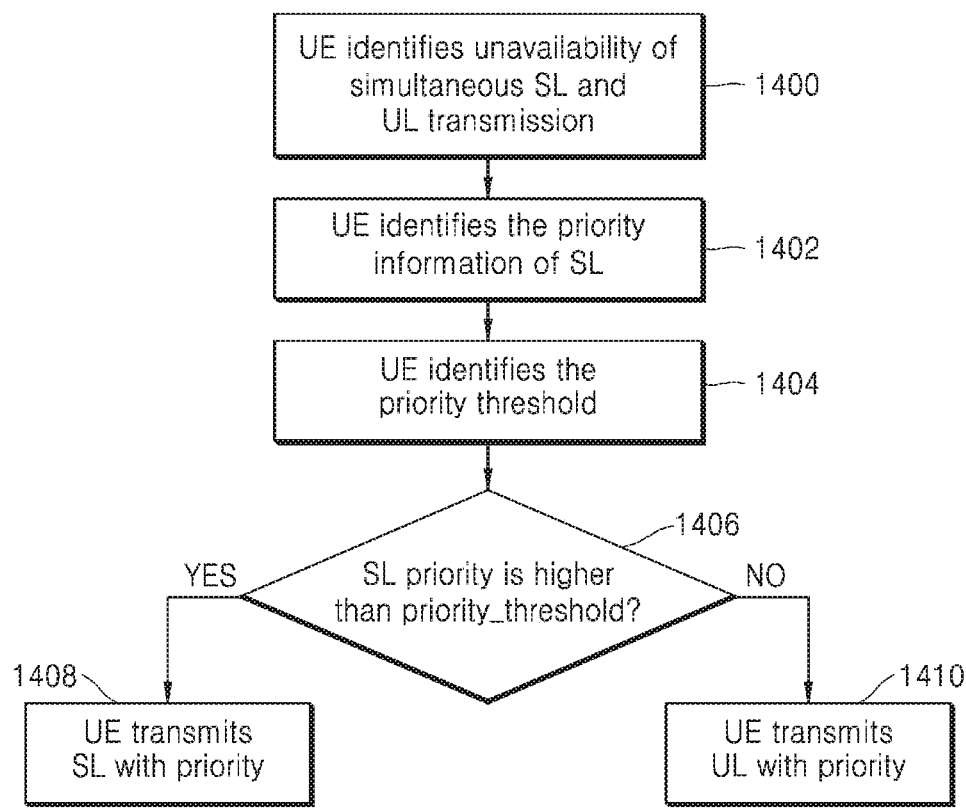
FIG. 14 is a diagram illustrating an operation of a terminal for determining a transmission priority, according to an embodiment of the disclosure.

FIG. 14 is a diagram illustrating an operation of a terminal for determining a transmission priority according to an embodiment of the disclosure.

Referring to FIG. 14, when a terminal may not simultaneously perform uplink transmission and sidelink transmission, the terminal may determine a transmission priority between an uplink and a sidelink based on a priority threshold. For example, the terminal may determine a priority of the sidelink based on the priority threshold. The priority threshold may be configured by the terminal by using at least one of RRC dedicated signaling, V2X SIB signaling, or pre-configuration. When it is determined that the priority of the sidelink is higher than the priority threshold, the terminal may determine to transmit the sidelink prior to the uplink. When it is determined that the priority of the sidelink is lower than the priority threshold, the terminal may determine to transmit the sidelink later than the uplink. The priority of the sidelink may be obtained according to at least one of procedures of FIGS. 12A through 13B.

According to an embodiment of the disclosure, a sidelink flow may refer to a data flow generated when a sidelink terminal transmits data to or transmits/receives data to/from another sidelink terminal, and an uplink flow may refer to a data flow generated when a terminal transmits data to a base station. Also, sidelink transmission may refer to transmission from a sidelink terminal to another sidelink terminal, and uplink transmission may refer to transmission from a terminal to a base station. However, the disclosure is not limited to the above examples.

In operation 1400, the terminal may determine that sidelink transmission and uplink transmission may not be simultaneously performed. In operation 1402, the terminal may determine a priority of a sidelink. According to an embodiment of the disclosure, the determination in operation 1402 may be performed according to at least one of procedures of FIGS. 12A through 13B. However, the disclosure is not limited to the above examples.

In operation 1404, the terminal may determine priority threshold information. In operation 1406, the terminal may determine whether the priority of the sidelink determined in operation 1402 is higher than a priority threshold.

When it is determined in operation 1406 that the priority of the sidelink is higher than the priority threshold, in operation 1408, the terminal may determine to first transmit the sidelink. When it is determined in operation 1406 that the priority of the sidelink is not higher than the priority threshold, in operation 1410, the terminal may determine to first transmit an uplink.

Also, according to an embodiment of the disclosure, even in FIG. 14, the terminal may determine to transmit MSG1, MSG3, and emergency traffic of the uplink prior to a sidelink packet by making an exception. That is, even when the sidelink is first transmitted, a certain uplink packet may be transmitted prior to a sidelink packet. In other words, the terminal may determine a priority of each of an uplink packet and a sidelink packet, or may determine a priority according to a packet type. The terminal may transmit a packet according to the determined priority.

Figure 15:
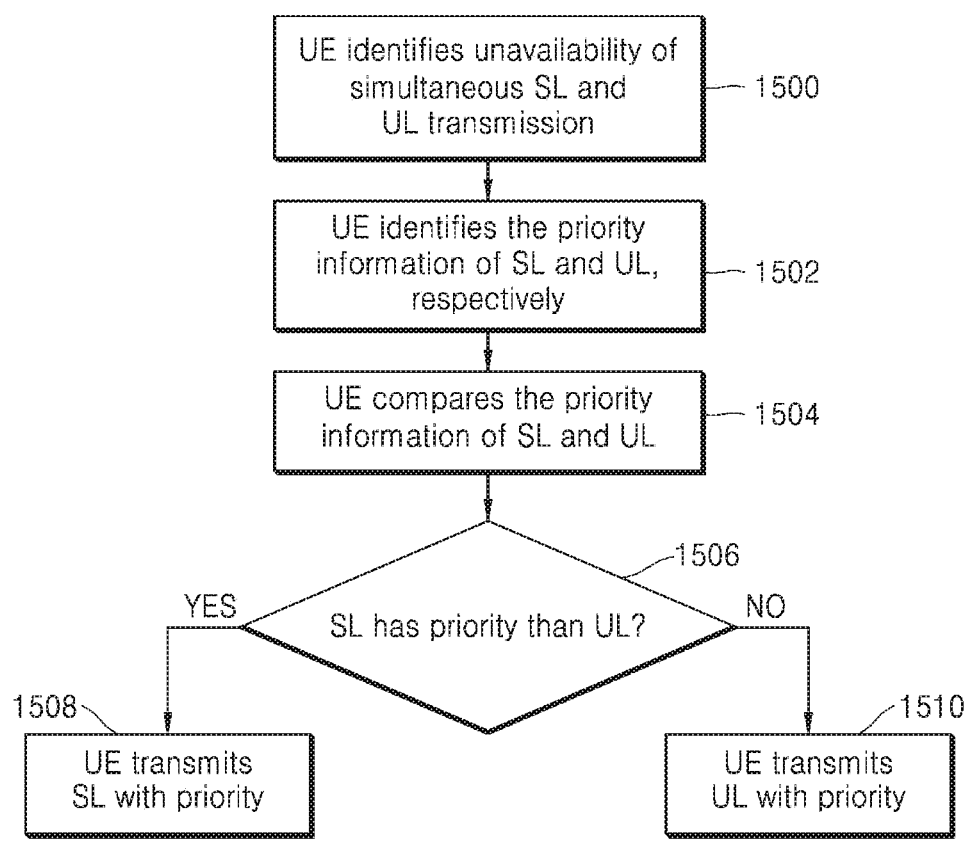
FIG. 15 is a diagram illustrating an operation of a terminal for determining a transmission priority, according to an embodiment of the disclosure.

FIG. 15 is a diagram illustrating an operation of a terminal for determining a transmission priority according to an embodiment of the disclosure.

Referring to FIG. 15, when a terminal may not simultaneously perform uplink transmission and sidelink transmission, the terminal may determine a transmission priority by comparing a priority of an uplink flow with a priority of a sidelink flow. The priority of the uplink flow and the priority of the sidelink flow may be configured by a base station or a system, and may be obtained according to at least one of procedures of FIGS. 12A through 13B.

According to an embodiment of the disclosure, a priority of an uplink flow or a radio bearer and a priority of a sidelink flow or a radio bearer may be configured as comparable values based on at least one of, for example, QFI, 5QI, or a default priority level. When it is determined that the priority of the sidelink flow or the radio bearer is higher than the priority of the uplink flow or the radio bearer, a terminal may determine to transmit a sidelink prior to an uplink. When it is determined that the priority of the sidelink flow or the radio bearer is lower than the priority of the uplink flow or the radio bearer, the terminal may determine to transmit the sidelink later than the uplink.

In operation 1500, a terminal may determine that sidelink transmission and uplink transmission may not be simultaneously performed. In operation 1502, the terminal may determine a priority of a sidelink and a priority of an uplink. According to an embodiment of the disclosure, the determination in operation 1502 may be performed according to at least one of procedures of FIGS. 12A through 13B. However, the disclosure is not limited to the above examples.

In operation 1504, the terminal may compare the priority of the sidelink with the priority of the uplink. In operation 1506, the terminal may determine whether the priority of the sidelink is higher than the priority of the uplink.

When it is determined in operation 1506 that the priority of the sidelink is higher than the priority of the uplink, in operation 1508, the terminal may determine to first transmit the sidelink. When it is determined in operation 1506 that the priority of the sidelink is not higher than the priority of the uplink, in operation 1510, the terminal may determine to first transmit the uplink.

Also, according to an embodiment of the disclosure, even in FIG. 15, the terminal may determine to transmit MSG1, MSG3, and emergency traffic of the uplink prior to a sidelink packet by making an exception. That is, even when the sidelink is first transmitted, a certain uplink packet may be transmitted prior to a sidelink packet. In other words, the terminal may determine a priority of each of an uplink packet and a sidelink packet, or may determine a priority according to a packet type. The terminal may transmit a packet according to the determined priority.

Also, according to an embodiment of the disclosure, when a terminal operates an LTE-based sidelink and an NR-based uplink and it is determined that sidelink transmission and uplink transmission may not be simultaneously performed, the terminal may determine a transmission priority by comparing a priority of a sidelink packet with a priority threshold. The priority threshold may be configured by the terminal by using at least one of RRC dedicated signaling, V2X SIB signaling, or pre-configuration. For example, when the priority of the sidelink packet is higher than the priority threshold, the terminal may determine to transmit the sidelink prior to the uplink. When the priority of the sidelink packet is lower than the priority threshold, the terminal may determine to transmit the sidelink later than the uplink.

According to an embodiment of the disclosure, when a terminal an LTE-based sidelink and an NR-based uplink and it is determined that sidelink transmission and uplink transmission may not be simultaneously performed, the terminal may determine a transmission priority by comparing a priority of a sidelink packet with a priority of an uplink 5QI (flow or bearer). For example, when the priority of the sidelink packet is higher than the priority of the uplink 5QI (flow or bearer), the terminal may transmit to transmit the sidelink prior to the uplink. When the priority of the sidelink packet is lower than the priority of the uplink 5QI (flow or bearer), the terminal may determine to transmit the sidelink later than the uplink. Also, as described above, the terminal may determine to transmit MSG1, MSG3, and emergency traffic of the uplink prior to a sidelink packet by making an exception.

According to an embodiment of the disclosure, when a terminal operates an NR-based sidelink and an LTE-based uplink and it is determined that sidelink transmission and uplink transmission may not be simultaneously performed, the terminal may determine a transmission priority by comparing the sidelink with a priority threshold. The priority threshold may be configured by the terminal by using at least one of RRC dedicated signaling, V2X SIB signaling, or pre-configuration. For example, when a priority of the sidelink is higher than the priority threshold, the terminal may determine to transmit the sidelink prior to the uplink. When the priority of the sidelink is lower than the priority threshold, the terminal may determine to transmit the sidelink later than the uplink. As another example, the terminal may determine a transmission priority by comparing the priority of the uplink with a priority of the sidelink. The priority of the uplink may be determined to apply a priority corresponding to a QoS class identifier (QCI) of the uplink. The priority of the sidelink may be applied to a sidelink flow or a radio bearer according to at least one embodiment of FIGS. 12A through 13B. When it is determined that the priority of the sidelink is higher than the priority of the uplink, the terminal may determine to transmit the sidelink prior to the uplink. When it is determined that the priority of the sidelink is lower than the priority of the uplink, the terminal may determine to transmit the sidelink later than the uplink. Also, as described above, the terminal may determine to transmit MSG1, MSG3, and emergency traffic of the uplink prior to a sidelink packet by making an exception.

Also, according to an embodiment of the disclosure, when a terminal operates an LTE sidelink, an NR sidelink, and an NR uplink, the terminal may temporarily determine a priority of the LTE sidelink and a priority of the NR sidelink. For example, the terminal may determine to apply a priority corresponding to a packet to the LTE sidelink and apply a priority corresponding to a flow or a radio bearer to the NR sidelink. The terminal may determine a transmission priority by comparing the priority of the LTE sidelink with the priority of the NR sidelink. The terminal may determine a transmission priority by applying a priority threshold to the priority of the LTE sidelink. The priority threshold may be configured by the terminal by using at least one of RRC dedicated signaling, V2X SIB signaling, or pre-configuration. When it is determined that the priority of the LTE sidelink is higher than the priority threshold, the terminal may determine to transmit the LTE sidelink prior to the NR sidelink. When it is determined that the priority of the LTE sidelink is lower than the priority threshold, the terminal may transmit to the LTE sidelink later than the NR sidelink. Also, the terminal may determine a transmission priority by applying the priority threshold to the priority of the NR sidelink. When it is determined that the priority of the NR sidelink is higher than the priority threshold, the terminal may determine to transmit the NR sidelink prior to the LTE sidelink. When it is determined that the priority of the NR sidelink is lower than the priority threshold, the terminal may determine to transmit the NR sidelink later than the LTE sidelink.

According to an embodiment of the disclosure, a terminal may determine a transmission priority by comparing a priority of an LTE sidelink packet with a priority of an NR sidelink. The priority of the NR sidelink may correspond to at least one of a priority of a sidelink radio bearer or a priority of a sidelink flow. When the priority of the LTE sidelink is higher than the priority of the NR sidelink, the terminal may determine to preferentially transmit the LTE sidelink. When the priority of the LTE sidelink is lower than the priority of the NR sidelink, the terminal may determine to transmit the LTE sidelink later. Also, as described above, the terminal may transmit MSG1, MSG3, and emergency traffic of the uplink prior to a sidelink packet by making an exception.

At least one embodiment of FIGS. 12A through 15 may be applied even to a case where a terminal configures a connection with two or more base stations by using dual connectivity. For example, a master cell group (MCG) in dual connectivity of a terminal may be an LTE base station or an NR base station. A secondary cell group (SCG) may be an LTE base station or an NR base station. A terminal may perform sidelink transmission with another terminal while performing uplink transmission with two or more base stations by using dual connectivity.

For example, a scenario where a terminal performs data transmission/reception through dual connectivity and a sidelink may include a case where a terminal performs packet transmission through an LTE sidelink, an LTE uplink, and an NR uplink. However, the disclosure is not limited to the above examples, and the scenario may include a case where a terminal performs packet transmission through an LTE sidelink, an NR uplink, and an NR uplink, a case where a terminal performs packet transmission through an NR sidelink, an LTE uplink, and an NR uplink, and a case where a terminal performs packet transmission through an NR sidelink, an NR uplink, and an NR uplink.

According to an embodiment of the disclosure, when a terminal may not simultaneously perform uplink transmission and sidelink transmission, the terminal may determine a priority between the uplink transmission and the sidelink transmission as in at least one embodiment of FIGS. 12A through 15. That is, the terminal may determine a priority between a sidelink and an uplink by comparing a priority of a sidelink packet with a priority threshold or may determine a priority between the sidelink and the uplink by comparing a priority of a flow, a packet, or a radio bearer. The terminal may determine to transmit MSG1, MSG3, and emergency traffic of an uplink prior to a sidelink packet by making an exception.

Also, according to an embodiment of the disclosure, a terminal may preferentially transmit an uplink whose transmission timing is determined or whose transmission resources are already determined (e.g., HARQ feedback or channel status feedback) or an uplink that has to be received within a certain time by a receiver end such as a packet duplication by making an exception. The terminal may preferentially transmit sidelink HARQ feedback information whose transmission timing is determined or whose transmission resources are already determined by making an exception.

Figure 16:
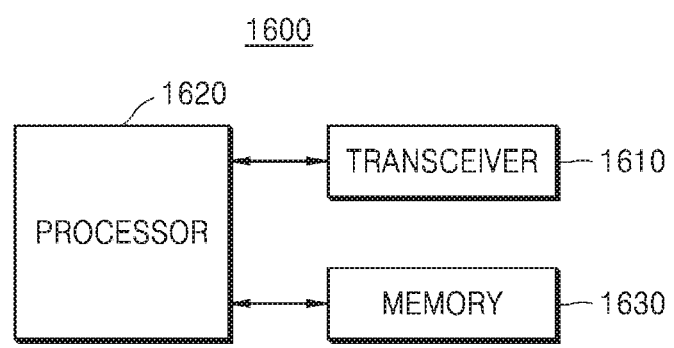
FIG. 16 is a block diagram illustrating an internal structure of a transmission terminal, according to an embodiment of the disclosure.

FIG. 16 is a block diagram illustrating an internal structure of a transmission terminal 1600 according to an embodiment of the disclosure.

Referring to FIG. 16, the transmission terminal 1600 of the disclosure may include a transceiver 1610, a processor (controller) 1620, and a memory (storage) 1630. However, elements of the transmission terminal 1600 are not limited thereto. For example, the transmission terminal 1600 may include more or fewer elements than the above elements. In addition, the transceiver 1610, the processor 1620, and the memory 1630 may be implemented as one chip.

According to an embodiment of the disclosure, the transceiver 1610 may transmit/receive a signal to/from a base station or another terminal. The signal transmitted/received to/from the base station or the other terminal may include a synchronization signal, a reference signal, control information, and data. The transceiver 1610 may include a radio frequency (RF) transmitter that up-converts and amplifies a frequency of a transmitted signal and an RF receiver that performs low-noise amplification on a received signal and down-converts a frequency. However, this is merely an example, and elements of the transceiver 1610 are not limited to the RF transmitter and the RF receiver. Also, the transceiver 1610 may receive a signal through a wireless channel, may output the signal to the processor 1620, and may transmit a signal output from the processor 1620 through the wireless channel.

According to an embodiment of the disclosure, the processor 1620 may control a series of processes of the transmission terminal 1600 according to an embodiment of the disclosure. For example, the processor 1620 may transmit QoS information of a V2X flow to a base station, may obtain a sidelink bearer configuration for the V2X flow, and may perform sidelink data transmission/reception based on the obtained sidelink bearer configuration.

According to an embodiment of the disclosure, the memory 1630 may store a program and data necessary to operate the transmission terminal 1600. Also, the memory 1630 may store control information or data included in a signal transmitted/received by the transmission terminal 1600. The memory 1630 may include a storage medium such as a read-only memory (ROM), a random-access memory (RAM), a hard disk, a compact disc-ROM (CD-ROM), or a digital versatile disk (DVD), or a combination of storage media. Also, a plurality of memories 1630 may be provided. Also, the memory 1630 may store a program for performing a method of configuring and operating a sidelink data bearer according to embodiments of the disclosure.

Figure 17:
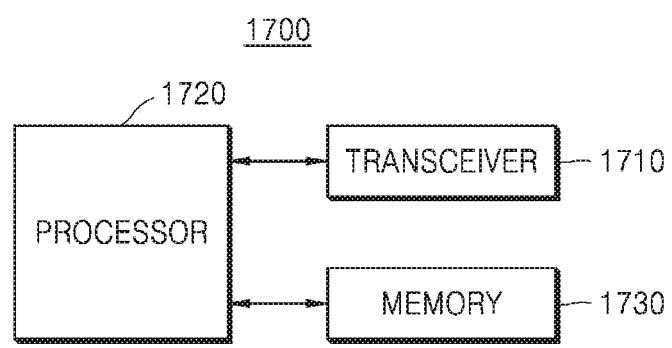
FIG. 17 is a block diagram illustrating an internal structure of a reception terminal, according to an embodiment of the disclosure.

FIG. 17 is a block diagram illustrating an internal structure of a reception terminal according to an embodiment of the disclosure.

Referring to FIG. 17, a reception terminal 1700 of the disclosure may include a transceiver 1710, a processor (controller) 1720, and a memory (storage) 1730. However, elements of the reception terminal 1700 are not limited thereto. For example, the reception terminal 1700 may include more or fewer elements than the above elements. In addition, the transceiver 1710, the processor 1720, and the memory 1730 may be implemented as one chip.

According to an embodiment of the disclosure, the transceiver 1710 may transmit/receive a signal to/from a base station or another terminal. The signal transmitted/received to/from the base station or the other terminal may include a synchronization signal, a reference signal, control information, and data. The transceiver 1710 may include an RF transmitter that up-converts and amplifies a frequency of a transmitted signal and an RF receiver that performs low-noise amplification on a received signal and down-converts a frequency. However, this is merely an example, and elements of the transceiver 1710 are not limited to the RF transmitter and the RF receiver. Also, the transceiver 1710 may receive a signal through a wireless channel, may output the signal to the processor 1720, and may transmit a signal output from the processor 1720 through the wireless channel.

According to an embodiment of the disclosure, the processor 1720 may control a series of processes of the reception terminal 1700 according to embodiments of the disclosure. For example, the processor 1720 may exchange sidelink bearer configuration information for a V2X flow with the transmission terminal 1600. However, the disclosure is not limited thereto, and the terminal may perform sidelink data transmission/reception with the transmission terminal 1600 based on sidelink bearer configuration information received from a base station.

According to an embodiment of the disclosure, the memory 1730 may store a program and data necessary to operate the reception terminal 1700. Also, the memory 1730 may store control information or data included in a signal transmitted/received by the reception terminal 1700. The memory 1730 may include a storage medium such as a ROM, a RAM, a hard disk, a CD-ROM, or a DVD, or a combination of storage media. Also, a plurality of memories 1730 may be provided. Also, the memory 1730 may store a program for performing a method of configuring and operating a sidelink data bearer according to embodiments of the disclosure.

Figure 18:
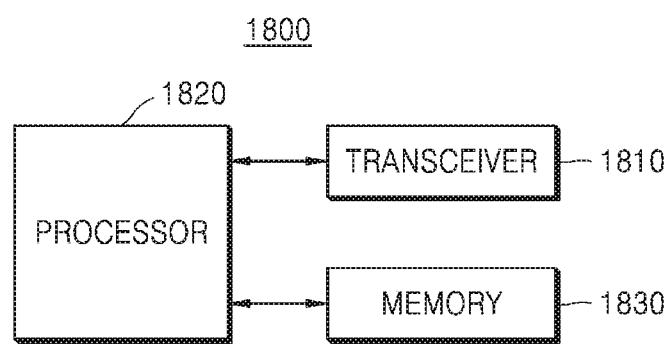
FIG. 18 is a block diagram illustrating an internal structure of a base station, according to an embodiment of the disclosure.

FIG. 18 is a block diagram illustrating an internal structure of a base station according to an embodiment of the disclosure.

Referring to FIG. 18, a base station 1800 of the disclosure may include a transceiver 1810, a processor (controller) 1820, and a memory (storage) 1830. However, elements of the base station 1800 are not limited thereto. For example, the base station 1800 may include more or fewer elements than the above elements. In addition, the transceiver 1810, the processor 1820, and the memory 1830 may be implemented as one chip.

According to an embodiment of the disclosure, the transceiver 1810 may transmit or receive a signal to or from a terminal. The signal transmitted or received to or from the terminal may include a synchronization signal, a reference signal, control information, and data. The transceiver 1810 may include an RF transmitter that up-converts and amplifies a frequency of a transmitted signal and an RF receiver that performs low-noise amplification on a received signal and down-converts a frequency. However, this is merely an example, and elements of the transceiver 1810 are not limited to the RF transmitter and the RF receiver. Also, the transceiver 1810 may receive a signal through a wireless channel, may output the signal to the processor 1820, and may transmit a signal output from the processor 1820 through the wireless channel.

According to an embodiment of the disclosure, the processor 1820 may control a series of processes of the base station 1800 according to embodiments of the disclosure. For example, the processor 1820 may transmit sidelink bearer configuration information based on QoS information of a V2X flow to the reception terminal 1700 or the base station 1800, and may configure priority information in a sidelink bearer configuration for the V2X flow.

According to an embodiment of the disclosure, the memory 1830 may store a program and data necessary to operate the base station 1800. Also, the memory 1830 may store control information or data included in a signal transmitted/received by the base station 1800. The memory 1830 may include a storage medium such as a ROM, a RAM, a hard disk, a CD-ROM, or a DVD, or a combination of storage media. Also, a plurality of memories 1830 may be provided. Also, the memory 1830 may store a program for performing a method of configuring and operating a sidelink data bearer according to embodiments of the disclosure.

The methods according to the claims or embodiments of the disclosure described herein may be implemented in the form of hardware, software, or a combination of hardware and software.

When the methods are implemented by software, a computer-readable storage medium for storing one or more programs (software modules) may be provided. The one or more programs stored in the computer-readable storage medium are configured to be executable by one or more processors in an electronic device. The one or more programs include instructions for allowing the electronic device to execute the methods according to the claims or embodiments of the disclosure described herein.

These programs (software modules or software) may be stored in a RAM, a non-volatile memory including a flash memory, a ROM, an electrically erasable programmable read only memory (EEPROM), a magnetic disc storage device, a CD-ROM, a DVD, another optical storage device, or a magnetic cassette. Alternatively, the programs may be stored in a memory configured by combining some or all of them. Also, each constituent memory may include a plurality of memories.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may connect to a device according to embodiments of the disclosure through an external port. Also, a separate storage device on a communication network may connect to a device according to embodiments of the disclosure.

According to an embodiment of the disclosure, in a V2X system, a base station may efficiently allocate sidelink transmission resources, and a terminal may reliably transmit data by efficiently performing data transmission in unicast and groupcast communication using a sidelink.

In specific embodiments of the disclosure described above, components included in the disclosure were expressed as singular or plural in accordance with the specific embodiments of the disclosure set forth. However, singular or plural representations are selected appropriately for the sake of convenience of explanation, the disclosure is not limited to the singular or plural constituent elements, and even expressed as a singular element, it may be composed of plural elements, and vice versa.

While the disclosure has been shown and described with reference to various embodiments thereof, it will be understood by those skilled in the art that various changes in form and details may be made therein without departing from the spirit and the scope of the disclosure as defined by the appended claims and their equivalents.

What is claimed is:

1. A communication method of a first sidelink terminal in a wireless communication system, the communication method comprising:

receiving sidelink radio bearer configuration information including default sidelink radio bearer information indicating a default sidelink radio bearer for a sidelink QoS flow and priority information comprising a priority value for sidelink data transmission;

identifying sidelink data to be transmitted to a second sidelink terminal;

identifying uplink data to be transmitted to a base station; and transmitting the sidelink data to the second sidelink terminal, prior to the uplink data, based on the default sidelink radio bearer information, in case that the priority value for the sidelink data transmission is less than a priority threshold value configured via a radio resource control (RRC) signal.

2. The communication method of claim 1, wherein the sidelink radio bearer configuration information is obtained from one of a response message to a configuration request message of the first sidelink terminal, system information received from the base station, or preconfigured configuration information.

3. The communication method of claim 1, wherein the receiving of the sidelink radio bearer configuration information comprises, if the first sidelink terminal is in an RRC_CONNECTED MODE:
   requesting, by the first sidelink terminal, to the base station, the sidelink radio bearer configuration information, and
   receiving the sidelink radio bearer configuration information through a response message in response to the requesting.

4. The communication method of claim 1, wherein the receiving of the sidelink radio bearer configuration information comprises, if the first sidelink terminal is in an RRC_IDLE MODE or an RRC_INACTIVE MODE, receiving the sidelink radio bearer configuration information through system information received from the base station.

5. The communication method of claim 1, further comprising, if the first sidelink terminal is in an Out-Of-Coverage state, obtaining the sidelink radio bearer configuration information from preconfigured information.

6. The communication method of claim 1, further comprising:
   obtaining new sidelink radio bearer configuration information during a state transition or coverage change of the first sidelink terminal; and
   applying the obtained new sidelink radio bearer configuration information.

7. The communication method of claim 1,
   wherein the transmitting of the sidelink data is further based on a determination, by the first sidelink terminal, that the uplink data and the sidelink data are unable to be simultaneously transmitted.

8. The communication method of claim 1,
   wherein the priority value for transmission of the sidelink data is configured for each sidelink flow, and
   wherein the uplink data comprises uplink data transmitted to the base station connected by using dual connectivity to the first sidelink terminal.

9. A first sidelink terminal of a wireless communication system, the first sidelink terminal comprising:
   a transceiver; and
   a processor coupled to the transceiver and configured to:
      receive sidelink radio bearer configuration information including default sidelink radio bearer information indicating a default sidelink radio bearer for a sidelink QoS flow and priority information comprising a priority value for sidelink data transmission,
      identify sidelink data to be transmitted to a second sidelink terminal,
      identify uplink data to be transmitted to a base station, and
      transmit the sidelink data to the second sidelink terminal, prior to the uplink data, based on the default sidelink radio bearer information, in case that the priority value for the sidelink data transmission is less than a priority threshold value configured via a radio resource control (RRC) signal.

10. The first sidelink terminal of claim 9, wherein the sidelink radio bearer configuration information is obtained from one of a response message to a configuration request message of the first sidelink terminal, system information received from the base station, or preconfigured configuration information.

11. The first sidelink terminal of claim 9, wherein the processor is further configured to, when the first sidelink terminal is in an RRC_CONNECTED MODE:
    request, by the first sidelink terminal, to the base station, the sidelink radio bearer configuration information, and
    receive the sidelink radio bearer configuration information through a response message in response to the request.

12. The first sidelink terminal of claim 9, wherein the processor is further configured to, when the first sidelink terminal is in an RRC_IDLE MODE or an RRC_INACTIVE MODE, receive the sidelink radio bearer configuration information through system information received from the base station.

13. The first sidelink terminal of claim 9, wherein the processor is further configured to, when the first sidelink terminal is in an Out-Of-Coverage state, obtain the sidelink radio bearer configuration information from preconfigured information.

14. The first sidelink terminal of claim 9, wherein the processor is further configured to:
    obtain new sidelink radio bearer configuration information during a state transition or coverage change of the first sidelink terminal, and
    apply the obtained new sidelink radio bearer configuration information.

15. The first sidelink terminal of claim 9,
    wherein the processor is further configured to determine that the uplink data and the sidelink data are unable to be simultaneously transmitted, and
    wherein the transmission of the sidelink data is further based on a determination that the uplink data and the sidelink data are unable to be simultaneously transmitted.

16. The first sidelink terminal of claim 9,
    wherein the priority value for transmission of the sidelink data is configured for each sidelink flow, and
    wherein the uplink data comprises uplink data transmitted to the base station connected by using dual connectivity to the first sidelink terminal.

* * * * *